United States Patent [19]

Letcher, Jr.

[11] Patent Number: 4,953,094
[45] Date of Patent: Aug. 28, 1990

[54] METHOD FOR LOFTING BLANKS AND COMPOUNDING PLATES FOR SHELL STRUCTURES

[75] Inventor: John S. Letcher, Jr., Southwest Harbor, Me.

[73] Assignee: Aerohydro, Inc., Southwest Harbor, Me.

[21] Appl. No.: 214,213

[22] Filed: Jul. 1, 1988

[51] Int. Cl.$^5$ .............................................. G06F 15/46
[52] U.S. Cl. .............................. 364/472; 364/474.24; 364/512
[58] Field of Search .................... 364/468, 472, 474.24, 364/191–193, 148, 188, 189, 513, 512, 200 MS File, 900 MS File

[56] References Cited

U.S. PATENT DOCUMENTS

| | | | |
|---|---|---|---|
| 4,615,011 | 9/1986 | Linsker | 364/468 X |
| 4,697,240 | 9/1987 | Cedar et al. | 364/474.24 X |
| 4,791,579 | 12/1988 | Kranitsky | 364/474.24 X |
| 4,792,889 | 12/1988 | Kragelin et al. | 364/474.24 X |

*Primary Examiner*—Joseph Ruggiero
*Attorney, Agent, or Firm*—Daniel H. Kane

[57] ABSTRACT

Methods for lofting flat metal starting blanks and for compounding curved metal plates from the flat starting blanks can be used in lofting and fabricating boat hulls, aircraft and automobile bodies, tanks, containment vessels, and other shell structures. The methods relate starting blanks and compounded plates to specified patches of a defined surface having compound curvature, or more precisely, non-zero Gaussian curvature. The surface is a representation of the shell structure to be fabricated by assembling the plates. In each of the methods the in-plane strain is related to instinsic geometry in a strain equation. The strain is explicitly or implicitly considered and solved for accurate and controlled implementation of both the lofting and cutting of the blanks and the compounding of the blank into the desired plate configuration. Solution of the strain equations for boundary nodes in the plane of the blank for cutting the blank minimizes field trim. Solution of the strain equations for strain distribution in the plane of the blank provides the guidance necessary for controlled introduction of strain through application of controlled compounding processes. Automated control may also be implemented by thickness monitoring at the nodal coordinates during compounding. Each of the methods of the present invention involves solution of the strains in a differential geometric mapping from one parametric surface manifold to another explicitly or implicitly reflecting the in-plane strain involved in compounding.

29 Claims, 5 Drawing Sheets

METHOD FOR LOFTING BLANKS AND COMPOUNDING PLATES FOR SHELL STRUCTURES

TECHNICAL FIELD

This invention relates to methods for lofting flat metal starting blanks and for compounding curved metal plates from the flat starting blanks. The invention is applicable for example in lofting and fabricating boat hulls, aircraft and automobile bodies, tanks, containment vessels, and other shell structures. Generally the methods relate to lofting flat starting blanks and compounding plates applicable to specified patches of a defined surface having compound curvature, or more precisely, non-zero Gaussian curvature. The surface is a representation of the shell structure to be fabricated by assembling the plates.

BACKGROUND ART

The metal used for the construction of thin curved shell structures such as ships, automobiles and aircraft is originally produced as thin, nominally flat sheet material. The formation of curved structures from flat sheet material generally involves some degree of elastic and/or plastic deformation of the material of the sheet referred to as strain. It is well known that there is a special class of surfaces, known as "developable" surfaces, which can be readily fabricated from sheet material, as they require only bending of the sheet rather than any degree of stretching, shrinking or other in-plane deformation. Consequently a developable surface is a highly preferred design for any application in which it will serve functionally. Such developable surfaces include, for example, cylindrical and conical surfaces.

However, developability is a highly restrictive property, and there are numerous situations in which requirements on the shape of the structure preclude or limit the use of developable surfaces. For example, hydrodynamic, aerodynamic, aesthetic or structural considerations may dictate the use of non-developable or "compound-curved" surfaces. In such cases the manufacturer must address the relatively difficult problem of forming these surfaces from flat sheet material.

A number of industrial "compounding" processes have been developed for this purpose. Most common is the use of matched dies, specialized tools whose high cost is distributed over a large number of mass-produced units. When the production volume is small, the known economical methods include spherical die pressing, peening, planishing and line heating. These methods utilize tools which are adaptable and inexpensive relative to matched dies. However, they demand relatively great amounts of skilled labor, because the forming processes are gradual and incremental and their control is highly empirical.

Two basic problems are present in the control of any of these incremental compounding processes. First, the machine operator knows only qualitatively, indirectly and empirically the complex relation between the application of the compounding tool and the resulting surface curvatures. Lacking quantitative guidance, the operator must depend on experience, training, judgment and intuition while incrementally approaching the desired curved configuration. This problem of achieving or implementing accurate and controlled compounding steps is referred to as Problem A.

Second, the in-plane strains which are a necessary part of the compounding process make it very difficult to relate the finished, 3-dimensional outline of a particular plate to the 2-dimensional shape of a flat starting "blank" to be cut from the original flat stock. Thus, excess material has to be left around the edges of a blank. The excess material at the edges is trimmed off in a trial-and-error fitting procedure referred to as "field trim" following compounding of the plate in order to fit the boundaries to adjacent plates or to other boundary lines on the 3-dimensional surface. In addition to requiring field trim steps, the excess material at the edges acts as a restraint to the compounding process. This problem of achieving or implementing accurate and controlled lofting of flat starting blanks for forming plates of compound curvature is referred to as Problem B.

The term "compound curvature", although commonly used in industry, does not appear either in the dictionary or in the literature of differential geometry, nor does the less common but synonymously used term "double curvature". However, the usage of both these terms is equivalent to the phrase "non-zero Gaussian curvature", which is founded in a rigorous geometric concept. "Compound curvature" is a qualitative term, not specifying the degree of curvature, while Gaussian curvature is quantitative.

A developable surface is characterized by having zero Gaussian curvature at every point. A plane is one example of a developable surface. Any developable surface such as a cylindrical surface or conical surface can be "developed" or flattened onto a plane by bending alone. A nondevelopable surface, one with non-zero Gaussian curvature, cannot.

The verb "to compound" is used herein to describe the introduction of Gaussian curvature into an originally plane piece of material by any mechanical or thermal process. A consequence of the geometric facts hereafter more fully developed is that compounding necessarily involves some degree of in-plane stretching or shrinking referred to as strain. Since the volume of material is conserved in each of these processes, the in-plane stretching or shrinking is generally accompanied by changes of thickness.

A brief description of several conventional mechanical compounding processes follows. These prior art methods are intended to be illustrative rather than all-inclusive.

Peening, (Planishing)

In this process repeated hammer blows are used directly to induce thickness reduction or thinning, thereby producing the required stretching in the plane of the material. The process is controlled by varying the number and/or weight of blows applied to various parts of the plate. For positive Gaussian curvature the thinning is concentrated in the center of the plate. For negative Gaussian curvature it is concentrated around the periphery.

Roller Planishing

In this process the thinning is accomplished by passing the work repeatedly between two rollers that are forced together. The process is controlled by varying the pressure of the rolls and the number of passes through the rolls made by each area of the plate.

Spherical Die Pressing

In this process a series of spherical matched dies of varying spherical radii are used to impress the appropriate amount of positive Gaussian curvature into each area of the plate. The dies are typically smaller in area than the plate, so that repeated pressings are required to form the complete plate. The die is changed if the curvature is not substantially constant. Saddle-shaped dies may be used similarly to impress negative curvature by die pressing.

Line Heating

This process consists of moving a point heat source over the plate in a pattern of lines that induce curvature by thermoplastic effects as set forth, for example, in "Line Heating", [1]; and Scully, K., [2]. The heat source can be adjusted so that its effect is predominantly bending, predominantly shrinking, or a combination of the two. The process is controlled by the intensity of heat, the speed of movement over the plate, and the pattern of lines where heat is applied. When properly controlled, the effect of one shrinking heat line is to draw the plate together by a predictable increment of distance perpendicular to the line. To produce positive Gaussian curvature, heat lines are concentrated toward the periphery of the plate. To produce negative Gaussian curvature the heat lines are concentrated toward the center.

The unifying feature of all these incremental compounding methods is that Gaussian curvature is produced by in-plane strain. The patterns of strain vary according to the process. In peening, planishing and die pressing the process possesses a radial symmetry that implies an isotropic strain pattern. Each hammer blow forces material outward equally in all directions. The sum of all the incremental hammer blows spread over an area of the work is therefore an isotropic expansion in the plane of the work. A small circle marked on the blank ends up as a somewhat larger circle on the finished plate, having been expanded equally in all directions.

Roller planishing contains a preferred direction along the axis of the rollers, and therefore produces an orthotropic strain pattern. A small circle marked on the blank is enlarged more along one axis than the other, producing an ellipse. In line heating the fundamental strain pattern is yet more pronouncedly anisotropic. The contraction produced by a heat line is entirely in the direction perpendicular to the line.

The various compounding processes share Problem A to varying degrees. That is, the operator of the compounding machine or tool knows only empirically, qualitatively, and by trial and error process how to apply the tool in order to achieve a desired configuration of compound or non-zero Gaussian curvature. The most direct shape control is available in die pressing. If the operator is told the specified Gaussian curvature for each area of the plate, he can select the dies accordingly to be applied to the blank. (Compensation for springback, or elastic strain of the plate accompanying release of pressure may have to be allowed empirically in the die selection.) In each of the other methods, the relationship between the application of the process, e.g. the intensity of peening in various areas of the plate, and the resulting curvature, is fairly obscure. Workers develop a sense of this relationship through training and practice, but the application of this experience is an art rather than a science.

Problem B is shared equally by all compounding processes. That is, there is no accurate method for lofting blanks to be compounded into plates with zero or minimal field trim. On a non-developable plate, the in-plane strains required to produce the requisite Gaussian curvature also produce distortions of any in-plane measurements intended to relate the outline of the blank to the finished outline of the plate. The nature of these distortions is sufficiently complex to have defeated all attempts to loft accurate blanks from 3-dimensional specifications of the patch shape and location. Various approximate, empirical methods are in use, for example as described by Newton, R. N., [3]; and Grilliat, J. (editor), [4]; but the solutions they provide are known to be more or less inaccurate and unreliable.

INFORMATION DISCLOSURE STATEMENT

The expansion or lofting of developable surfaces by both graphical methods as described by Kilgore, U., [5], and computer methods as set forth in Nolan, T. J., [6] is well known. Because developable surface expansion involves bending only, and is confined to surfaces of zero Gaussian curvature (except for small amounts of incidental anticlastic curvature), it bears little relationship to the present invention. The present invention seeks to find plane expansion of curved surfaces with compound or non-zero Gaussian curvature and to loft starting blanks to a high enough degree of accuracy to eliminate or minimize field trim. While the invention does apply to surfaces of zero Gaussian curvature, and thus provides a new way to expand developable plates, it is the first available method for accurate expansion of surfaces of non-zero Gaussian curvature and accurate lofting of starting blanks for plates of non-zero Gaussian curvature.

The plate expansion problem, that is the problem of lofting starting blanks for compounding into plates of nonzero Gaussian curvature (Problem B) is well known in shipbuilding. One traditional solution has been the fabrication of a "plating model", an accurate scale model of the hull, on which plate boundaries are carefully scribed. Individual plates are traced onto paper from the model, and then expanded graphically to full size. There are several problems with this approach. First, paper will not lie flat on a compound-curved portion of the model surface. Second, in expansion to full size, all tracing errors are likewise expanded, so accuracy is limited. Finally, the method makes no allowance for the strains induced in the metal plate during forming.

There are standard approximate methods for curved plate expansion from a full-size or large-scale lofting of ship lines described for example by Newton, R. N., [3]; and Grilliat, J., Ed., [4]. This is generally acknowledged to be the most difficult problem in ship lofting, for which no accurate solution is known. The approximate graphical methods typically make no quantitative allowance for the strain involved in forming or compounding. In application, liberal edge allowances are made in lofting blanks to accommodate the strain and the extra boundary material is removed through field trim.

There are several computer program systems in existence for computer-aided manufacturing of ships, e.g. "AUTOKON", "CIRCE", "STEERBEAR", "BRITSHIPS", (all trademarks), etc. Some of these include one or more methods of curved plate expansion or lofting. For the most part, algorithmic and programming details of these program systems are proprietary. In particular, the present inventor knows of no public disclosure of the methods of curved plate expansion used in any CAD/CAM program. Kuo, C., [7] gives a brief description of a plate expansion program included in the "BRITSHIPS" (trademark) system. According to this method, a plate is broken up into triangular or rectangular elements, and the calculation involves the geodesic distances between corners of the elements. To that extent only, it is similar to some of the methods disclosed herein. However, there is no indication that strains are explicitly taken into consideration.

There is a nonobvious similarity between plate expansion for unidirectional strain and a fundamental problem of sailmaking. A sail is ideally a surface of positive Gaussian curvature, which is made by sewing together strips or panels of developable fabric. The Gaussian curvature, and hence the final aerodynamic shape of the sail, is indirectly controlled by varying the overlap of the seams when sewing the strips together, a procedure known as "broadseaming". Problems A and B both arise in this different and nonobvious context of lofting cloth panels for sails.

Sailmakers have long had empirical and graphical methods for dealing with both Problems A & B in the context of sailmaking to a sufficient degree of accuracy for manufacture of sails. Recently, proprietary computer programs have been developed to assist in sail manufacture. It is not known whether any of these programs use the procedures developed by the present invention with respect to the unidirectional compounding of plates. The content of one sailmaking program, partially disclosed in Clemmer, G., [8], is very different in making no use of geodesics. In fact it is closely based on the developable surface algorithms of Nolan, T. J. [6]. The list of cited references has been tabulated and appears as Table 4 at the end of the specification.

MATHEMATICAL BACKGROUND

The present invention for the first time applies the differential geometry of Gauss to the problem of accurately lofting the boundary dimension of blanks for compounding into plates of non-zero Gaussian curvature. This nonobvious application of the differential geometry of two dimensional manifolds to the problem of fabrication of shell structures of non-zero Gaussian curvature also solves for the first time, the problem of controlled compounding of plates with non-zero Gaussian curvature. The invention provides methods for accurate and controlled application of a variety of mechanical compounding processes to achieve desired plate configurations of non-zero Gaussian curvature. Understanding of the present invention is facilitated by a preliminary explanation of the differential geometry developed by Carl Friedrich Gauss (1777–1855).

A given surface embedded in 3 dimensional space may be described in a multiply infinite number of ways by parametric equations of the form:

$$x = x(u^1, u^2) \qquad \text{Eq. (1)}$$
$$y = y(u^1, u^2)$$
$$z = z(u^1, u^2)$$

where x,y,z are Cartesian coordinates of a point and $u^1, u^2$ are "parametric coordinates." The differential distance ds from a point associated with the parameter differentials $du^1, du^2$ is given by the quadratic form $$ds^2 = g_{11}(du^1)^2 + 2g_{12}du^1du^2 + g_{22}(du^2)^2 \qquad \text{Eq. (2)}$$

whose coefficients are the components of the metric tensor $g_{\alpha\beta}$. The discriminant g of the metric tensor is denoted by $g = g_{11}g_{22} - g_{12}^2$. Explanations, derivations and examples of geometry of surfaces described in these terms may be found in standard texts on differential geometry, for example Kreyszig, E. [9]; Eisenhart, L. P. [10]; Guggenheimer, H. W. [11]. Some important aspects of differential geometry utilized in the invention are briefly summarized below.

Gaussian curvature is an important element of the theory of surfaces. Briefly, Gaussian curvature is defined as follows:

1. At any point P in a surface S where S is sufficiently smooth, there is a unique tangent plane T, and a unique normal line N through P, normal to T.

2. There is a one-parameter family F of "normal planes" which pass through P and include the normal line N. Any member of F can be identified by the dihedral angle A which it makes with some arbitrary reference member of F.

3. Each plane in F cuts the surface S in a plane curve C, known as a "normal section". The curvature of C at P is called the "normal curvature" of S.

4. Normal curvature depends on A. As A varies, normal curvature goes through maximum and minimum values K1, K2, known as the "principal curvatures".

5. Gaussian curvature K is the product of K1 and K2.

6. K of course may vary with P, but K is independent of any particular coordinates that have been chosen to describe the surface S.

Since the two curvatures that are multiplied to obtain K are signed quantities, K has a sign which has important geometric significance. At a point where the principal curvatures have the same sign, K is positive, and the surface presents a convex shape on one side and concave shape on the other. At a point where the principal curvatures have opposite signs, K is negative, and the surface presents a saddle shape when viewed from either side.

Gauss made the notable discovery found in Kreyszig, E., [9] Theorem 46.1, that Gaussian curvature is an "intrinsic" property of a surface, i.e. it can be derived wholly from distance measurements within the surface. The quantitative statement of this fact is the "Equation of Gauss" set forth in Kreyszig, E., [9], Eq. 46.17. The Equation of Gauss gives the Gaussian curvature K as a function of the metric tensor $g_{\alpha\beta}(u^1,u^2)$ having the three tensor components $g_{11}$, $g_{12}$, $g_{22}$ and allows calculation of the Gaussian curvature K from the metric tensor. Any deformation of the surface that consists of bending alone, without in-plane stretching, shrinking, or strain of any element conserves Gaussian curvature.

The concept of a geodesic curve (or "geodesic") is likewise fundamental to the theory of surfaces, and can be found in Kreyszig, E. [9]; Eisenhart, L. P. [10]; and Guggenheimer, H. W. [11], referred to above. Briefly, a geodesic line or curve or simply a "geodesic" is also a feature of the intrinsic geometry of a surface defined as follows:

1. On a curve C lying in a surface S, select a point P and construct the tangent plane T to S at P.
2. Project C onto T, forming a plane curve PC in T.
3. "Geodesic curvature" of C at P is the curvature of PC at P.
4. A geodesic is a curve lying in S and having zero geodesic curvature throughout its length.
5. The shortest curve within the surface S joining two given points in S is an arc of a geodesic, see e.g. Kreyszig, E. [9], Theorem 51.1.
6. Geodesics are part of the intrinsic geometry of a surface, i.e. they are invariant under bending, see e.g. Kreyszig, E. [9], Theorem 49.1.

Geodesics can be computed by solution of a second-order nonlinear ordinary differential equation as shown by Kreyszig, E. [9], Eq. 50.2 with either initial conditions in the form of a point and a direction in S or in the form of two-point boundary conditions. A number of standard numerical methods are available for solving ordinary differential equations described by Rice, J. R., [12], Chapter 9. Solution of the two-point boundary-value problem, that is identifying the geodesic line or curve between two points, is referred to below as "snapping" a geodesic, while solution of the initial-value problem in the form of a point and a direction is referred to as "shooting" a geodesic.

DISCLOSURE OF THE INVENTION

The present invention has discovered the manner of application of these principles of the intrinsic geometry of curved surfaces to the problem of fabricating a three-dimensional shell structure as hereafter described. In this context the following terminology is used. The shell structure or "structure" is defined, specified or represented by a curved surface in three dimensions, including boundary lines. This idealization of the structure which may be a physical model, written description, drawing, tables of numbers or indices, or mathematical description etc., is referred to as the "surface." The complete surface is typically subdivided for fabrication into subsurfaces specified by certain boundary lines on the surface. Such a defined subsurface is referred to as a "patch." The single piece of material from the structure that conforms to the patch is called a "plate." One or more plates are assembled to fabricate the structure.

It is an object of the present invention to provide controlled methods for compounding or forming a plate that is precisely applicable to a specified patch. By "precisely applicable" is intended to mean that the plate has the identical intrinsic geometry as the patch in terms of the distribution of Gaussian curvature and ultimately the same or matching boundary lines. Before or after compounding, or before or while assembling the structure it may well be necessary to subject the plate to additional bending. As in the fabrication of developable surfaces, bending is assumed to be a trivial operation once a plate has been formed which is "applicable."

It should be clarified that the term "applicable" does not necessarily mean that the plate is "congruent" to the specified patch on the surface. "Applicable" is therefore defined to mean that the plate will be congruent after any necessary bending. A term from differential geometry synonymous with "applicable" is the term "isometric."

Another object of the present invention is to provide a process for accurately lofting a flat starting blank for forming a plate of non-zero Gaussian curvature. The method is viewed as a "mapping" from one surface to another. Furthermore the reverse process of controlled mechanical compounding of the blank to a plate having a selected distribution of non-zero Gaussian curvature is viewed as a reverse mapping from the development plane of the blank to the respective patch of the surface. In the special case of compounding processes with isotropic strain, that is substantially equal strain in all directions of the plane, the mapping is a "conformal mapping" according to the invention.

A feature and advantage of the "mapping" strategy of the present invention is that complex plates with complex distributions of non-zero Gaussian curvature may be expanded for lofting flat starting blanks defining accurate boundaries for the blank substantially eliminating the field trim steps after compounding. Furthermore the invention provides quantitative direction and control for the compounding steps or compounding operations for accurate and controlled compounding of a blank into a plate applicable to a specified patch. Further background on "mapping" as a conceptual basis of the present invention is as follows.

A mapping from one surface S1 to another surface S2 is a rule or function that relates each point of S2 to a point of S1. Let P refer to the patch and B to the blank. The mapping M that the invention provides is the correspondence of material points on B to their positions on P. If arbitrary allowable coordinates $u^1, u^2$, having the metric tensor $g_{\alpha\beta}$ are introduced on P, then under the mapping M there are image coordinates $u^1, u^2$ on B with, in general, a different metric tensor $G_{\alpha\beta}$. The differences between $g_{\alpha\beta}$ and $G_{\alpha\beta}$ reflect the in-plane strain involved in compounding. The coordinates are also referred to as "convected" or "intrinsic" coordinates which travel with the material particles as strain is introduced in the blank by a compounding process.

Consider first the special case in which the relation of the two metric tensors is a direct proportion, i.e.

$$G_{\alpha\beta} = (1+\epsilon)^2 g_{\alpha\beta} \qquad \text{Eq. (3)}$$

with the "strain parameter" $\epsilon$ a function of $u^1, u^2$. The mapping is then conformal as established in Kreyszig, E., [9] Theorem 61.1. That is, it preserves angles, and produces at every point an isotropic dilatation with linear proportion $(1+\epsilon)$. As noted in the preceding section, this particular strain pattern is a realistic description of the deformation resulting from several actual compounding processes. It is shown in Kreyszig, E., [9] Theorem 62.1 that any sufficiently smooth portion of a surface can be mapped conformally into a plane. Also, such a mapping is not unique.

Since the final plate P is given, the geometry of P is known in full detail. It is also known that at least one distribution of E will map P conformally onto B. Very little so far is known about the image B; however, it is known that B is plane. In particular, it has zero Gaussian curvature. Expressing this fact by inserting $G_{\alpha\beta}$ from Eq. (3) into the equation of Gauss, the present invention provides and it is believed to be for the first time, the "strain equation for isotropic strain":

$$\Delta[\ln(+\epsilon)] = K(u^1, u^2) \qquad \text{Eq. (4)}$$

$K(u^1, u^2)$ is the distribution of Gaussian curvature K over P, ln signifies the natural logarithm and $\Delta$ is the second differential parameter of Beltrami found in Kreyszig, E., [9] as Eq. 75.5. As there set forth "$\Delta$" is an elliptic, second order, linear differential operator, analogous to the Laplacian operator in the plane:

$$\Delta\phi = 1/\sqrt{g} \{\partial/\partial u^1 (g_{22}/\sqrt{g} \cdot \partial\phi/\partial u^1 - g_{12}/\sqrt{g} \cdot \partial\phi/\partial u^2) + \partial/\partial u^2 (-g_{12}/\sqrt{g} \cdot \partial\phi/\partial u^1 + g_{11}/\sqrt{g} \cdot \partial\phi/\partial u^2)\} \qquad \text{Eq. (5)}$$

Consequently an appropriate boundary condition leading to a unique solution for Eq. (4) is specification of $\epsilon$ all around the perimeter of P, the so-called "Dirichlet" boundary condition.

As explained above, all compounding processes do not produce isotropic strain. Roller planishing is an example where an orthotropic strain pattern is characteristic. Roller planishing may still be used to create an approximately isotropic dilatation by alternating directions of rolling, but the dimensions of the work and/or machine might also make this inconvenient. Line heating is an example where an orthotropic strain pattern is known to prevail: the shrinkage produced by a heat line is entirely in the direction perpendicular to the line.

When strain is anisotropic, it can be characterized at any point by three parameters: (1) the direction of greatest elongation; (2) the magnitude of strain parameter $\epsilon$ for the greatest strain elongation; and (3) the ratio E between the greatest and least elongations. It is shown in Fung, Y. C., [13], that the elongation of any line element, whose direction is at an angle $\theta$ from the direction of greatest elongation, is then given by $$\epsilon(\theta) = \epsilon(\cos^2\theta + E\sin^2\theta) \qquad \text{Eq. (6)}$$

The strain parameter $\epsilon$ and the angular orientation $\theta$ are functions of the parametric coordinates $u^1, u^2$. It is assumed that E is a constant characteristic of the compounding process. For example, $E = -1$ for an isotropic process and $E = 0$ for line heating.

A pattern of anisotropic strain having constant E and unknown $\epsilon$ leads in a similar fashion to a second-order partial differential equation for $\epsilon$. When the general strain pattern of Eq. (6) is applied to the surface having metric tensor $g_{\alpha\beta}$, with $\theta$ measured from the direction of the coordinate lines $u^2 =$ constant, the convected coordinates on the resulting surface have the metric tensor $G_{\alpha\beta}$ where $$\begin{aligned} G_{11} &= g_{11}[(1+\epsilon)^2 \cos^2\theta + (1+E\epsilon)^2 \sin^2\theta] \\ G_{12} &= (1+\epsilon)^2 (g_{12}\cos\theta + \sqrt{g}\sin\theta)\cos\theta + \\ &\quad (1+E\epsilon)^2 (\sqrt{g}\cos\theta - g_{12}\sin\theta)\sin\theta \\ G_{22} &= 1/g_{11}[(1+\epsilon)^2 (g_{12}\cos\theta + \sqrt{g}\sin\theta)^2 + \\ &\quad (1+E\epsilon)^2 (\sqrt{g}\cos\theta - g_{12}\sin\theta)^2] \end{aligned} \qquad \text{Eq. (7)}$$

Inserting the components into the equation of Gauss, and requiring that the surface they describe have zero Gaussian curvature, yields the general strain equation $$\{[\epsilon] = \}[G_{\alpha\beta}] \qquad \text{Eq. (8)}$$

where {and} second-order differential operators acting on the scalar quantity $\epsilon$ and the tensor $g_{\alpha\beta}$ respectively. Provided $E > 0$, the equation is elliptic, so a Dirichlet boundary-value problem is well posed. When $E = 0$, the equation is parabolic, and requires different boundary conditions as set forth in a further embodiment of the invention for unidirectional compounding such as line heating.

SUMMARY OF THE INVENTION

The present invention provides three related methods or embodiments for mapping coordinates between the plate or patch and the flat starting blank. The mapping steps from the complex plate or patch having a defined distribution of non-zero Gaussian curvature to the flat starting blank in the development plane solves the problem of expansion of the plate and accurately lofting the blank. The mapping which explicitly yields the strain distribution across the plane of the blank furthermore solves the problem of providing direct quantitative control over the compounding processes for compounding the blank into the desired three-dimensional plate configuration.

In each of the methods of the present invention the in-plane strain is, for the first time explicitly or implicitly considered and solved for accurate and controlled implementation of both the lofting and cutting of the blanks and the compounding of the blank into the desired plate configuration. Solution of the strain distribution in the plane of the blank provides the guidance necessary for controlled introduction of strain through application of controlled compounding processes. Throughout the steps the explicit solution of the strains for the representative set of nodes or nodal points also provides continuous information on thickness variations in the starting blank and plate so that automated control may also be implemented by thickness monitoring at the nodal coordinates during compounding. Each of the methods of the present invention involves solution of the strains in a differential geometric mapping from one surface to another explicitly or implicitly reflecting the in-plane strain involved in compounding.

Each of the method embodiments of the present invention begins with a description or specification of the surface in three dimensions representing the shell structure to be fabricated. If a parametric surface description is not available, the method may begin with generating a suitable mathematical description of the surface. The general procedure for generating parametric surface descriptions of hulls and shells can be found in a variety of references for example: John S. Letcher, Jr., [14]; John S. Letcher, Jr., [15]; John S. Letcher, Jr. [16]; Chengi Kuo, [17]; Faux and Pratt, [18]; Kreyszig, E. [9]; and other cited references.

The generic method for lofting a flat starting blank and for compounding a 3-D plate of non-zero Gaussian curvature comprises specifying the surface shape in three dimensions and setting up and solving equations that relate the strain and displacements required to make a plane image from the 3-D surface to the intrinsic geometry of the 3-D surface. The displacement solutions at nodes around the periphery of the surface are used for delineating the boundary shape of the blank for cutting or for control of cutting of the flat starting blank. The strain solutions are used for providing a strain map for controlling compounding steps for producing a 3-D plate from the blank.

According to a first method embodiment for lofting a flat starting blank for compounding into a plate applicable to a specified patch on a surface having non-zero Gaussian curvature, the invention contemplates generating a mathematical description of the surface using a parametric surface description in parametric coordinates $u^1, u^2$ and obtaining two families of intersecting parametric lines or curves defining the surface. A mesh or set of representative coordinates or nodes may be established at the intersecting parametric lines representative of the surface and boundaries of the patch. The mathematical description includes information establishing the metric tensor $g_{\alpha\beta}$ and Gaussian curvature $K$ $(u^1, u^2)$ for the parametric coordinates $(u^1, u^2)$ of the patch.

The first method of the invention involves setting up the strain equation relating the required strain parameter $\epsilon$ to the intrinsic geometry of the patch as represented by the components of the metric tensor $g_{\alpha\beta}$ of the patch. The strain equation is derived for the mapping effected by a selected compounding method and for the desired mapping onto a plane. The strain equation is solved for the distribution of the strain parameter $\epsilon$ across the blank in the plane of the blank at the representative surface coordinates. The distribution of strain so derived is the solution of Problem A.

The further steps include mapping specifically the boundary coordinates $u^1, u^2$ of the patch having metric tensor $g_{\alpha\beta}$ to image coordinates of the boundary of the blank in the plane of the blank having metric tensor $G_{\alpha\beta}$. In order to define the boundary coordinates of the blank the invention provides the steps of setting up the formulae of Gauss for the coordinates of the blank as a function of the metric tensor $G_{\alpha\beta}$ and solving the formulae of Gauss for the boundary coordinates of the blank. The boundary lines are then delineated for cutting the blank so that the field trim is minimized or eliminated after compounding to the plate during fabrication of the corresponding shell structure. This is the solution to Problem B.

In the case of isotropic strain, the strain equation relating the strain parameter E to the Gaussian curvature $K(u^1, u^2)$ at the parametric coordinates $u^1, u^2$ over the patch is Equation (4), the fundamental strain equation for isotropic strain. Furthermore in the case of an isotropic strain distribution the mapping of coordinates having metric tensor $g_{\alpha\beta}$ to image coordinates having metric tensor $G_{\alpha\beta}$ is a conformal mapping.

In the case of anisotropic strain distribution, the anisotropic strain $\epsilon$ ($\theta$) is a function of the angle from the direction of greatest strain elongation as set forth in Equation (6), where E is a constant characteristic of the anisotropy between E=1 for isotropic strain, and E=0 for unidirectional strain.

According to a second method and preferred method for lofting a flat starting blank for compounding a plate applicable to a specified patch on a surface of non-zero Gaussian curvature distribution, the invention contemplates specifying the geometry of the patch in three dimensions including the boundaries of the patch and the surface description. A set of nodes or nodal points representative of the boundaries and surface of the patch are selected. Further steps include snapping a mesh of geodesic lines over the surface between the nodes and measuring their distances by the arc lengths of the geodesic lines between nodes.

Further steps require setting up the link equation for each geodesic line and solving the link equations for the nodal point coordinate images $(X_i, Y_i)$ in the plane of the blank and for the nodal strain parameters $\epsilon_i$ at the respective nodal point coordinate images $(X_i, Y_i)$ in the plane of the blank. The nodal point image coordinates $(X_i, Y_i)$ for the boundaries of the blank are used to specify the cutting lines for the blank to minimize field trim on a plate to be compounded from the blank for the respective patch.

In the preferred embodiment the step of selecting a set of nodes is implemented by subdividing the patch into a set of triangular elements and selecting the nodes where the element corners meet.

According to the third embodiment of the invention a method is provided for lofting a flat starting blank for compounding a plate using a unidirectional compounding process. The method also produces a plate applicable to a specified patch on a surface having nonzero Gaussian curvature. The surface represents a 3-D shell structure to be fabricated by assembling plates. This method proceeds in the most general case by selecting an arbitrary curve G1 between two selected points P1 and P2 on the patch P, and shooting a family of geodesic lines GF from points along G1 in the direction orthogonal to the curve G1. According to the preferred method curve G1 may be advantageously selected to be a geodesic, or, for a surface of revolution, a "parallel" of the surface with the orthogonal geodesic lines being "meridians."

The various members of the family of geodesic lines GF are identified according to the arc length $v^2$ along G1 measured from P1 to the intersection of the member of GF with G1. The arc length $v^1$ along any member of GF is also measured from G1. The invention contemplates setting up the metric tensor for parametric coordinates $(v^1, v^2)$ of the geodesic lines and setting up the strain equation in ordinary differential equation form relating the strain parameter at the parametric coordinates $v^1, v^2$ to the distribution of Gaussian curvature K across the patch. The unidirectional strain used for compounding is imposed in the direction perpendicular to the member of GF, ie., $\theta = 90°$ in Eq. (7).

The in-plane strain is determined by solving the ordinary differential strain equation at parametric coordinates $(v^1, v^2)$ of the geodesic lines for the strain distribution across the blank mapped on to the plane of the blank at image coordinates (X,Y). The lines $v^2 =$ constant in the plane of the blank are generally a family of straight lines; if G1 is a geodesic, the image coordinates $v^1, v^2$ in the plane of the blank are cartesian coordinates. Finally the coordinates (X,Y) for the boundary lines of the blank are resolved for cutting the blank so that field trim is minimized or eliminated after compounding the plate during fabrication of the corresponding shell structure.

Generally, the mapping of parametric coordinates of P on to the image coordinates of the plane of the blank B is accomplished by unidirectional strain in the $v^2$ direction i.e., in the direction perpendicular to the lines $v^2 =$ constant. This is represented by a pattern of heat lines parallel to the family of geodesics or geodesic lines GF.

Following lofting of the blank according to any of the three embodiments of the invention a flat blank is cut along the specified boundary cutting lines which assure eliminating or minimizing field trim on a plate to be compounded from the blank. Specification of the outline of the blank is not necessarily a physical delineation on the blank. The outline of the blank may be specified in computer memory or in a program for program control of a compounding machine or numerically controlled machine such as a torch, saw, cutter or laser for cutting the blank along the delineated boundary.

Following cutting of the blank, the surface of the blank may be marked with indicia or markings representing the specified nodal strain distribution across the blank solved at the selected image coordinates. The step of marking the surface of the blank with indicia or markings representing the strain distribution may be implemented by applying a density map on the surface of the blank of marks representative of mechanical compounding steps for a particular mechanical compounding process. This marking or physical mapping permits controlled introduction of the identified strain distribution across the blank necessary to produce a plate applicable to the specified patch by manually controlled or semi-automated compounding processes.

Alternatively the markings representing the strain distribution across the blank may constitute a contour map of isostrain contour lines to guide the application of mechanical compounding steps of a specified compounding process and the density of applied steps for introducing the identified strain distribution across the blank.

The marks representing the strain distribution, density map for compounding steps to implement the strain distribution, or isostrain contour lines are not necessarily physical markings on the blank but may be specified in computer memory or in a program for automated control of compounding machines. Strain distribution or density mapping may be represented in a table or series of instructions without any physical marking or human intervention to control, for example, an automatic peening hammer and implement isotropic strain patterns. By way of another example, a roller planishing apparatus may be automatically controlled for orienting and rolling a plate in accordance with a density map in tables, instructions or algorithms. Numerical control tapes etc. may also be used to control a heating torch or laser to implement unidirectional strain heat shrink line maps etc.

The invention also contemplates quantitative control of the compounding process by monitoring the thickness of the blank during the compounding steps. The thickness t of the plate is related to the thickness t' of the blank through the strain distribution according to the equation:

$$t'/t = (1 + E\epsilon)(1 + \epsilon) \qquad \text{Eq. (9)}$$

Thickness monitoring may be accomplished for example, by using a sonic tester or sonic interferometer having a resonator probe applied against the plate. Thickness surveys may be used to control the compounding process to achieve the target strain distribution across the plate.

It is generally contemplated by the present invention that the compounding processes applied to a blank are applied with steps of equal mechanical or thermal intensity. In this respect the information given to the artisan or operator of the compounding tool, machine or method or the information stored in computer memory or in a program or algorithm is a strain distribution map in the form of a density map of indicia representing the compounding steps applied by the compounding process such as peening hammer blows, planishing roller lines or heat shrink lines where the process steps are deemed to be applied with substantially uniform intensity. It is also possible however to modulate the applied pressure or applied heat to achieve the desired strain distribution. In this respect the present invention could also provide density maps or contour maps of modulated indicia or modulated marks representing modulated intensity of application of the mechanical or thermal steps. In either respect, the strain distribution resolved by the methods of the present invention provides the basis for accurate and controlled introduction of strain across the blank to achieve the desired plate configuration.

As used in the specification and claims therefore the steps of strain distribution mapping and marking and the mapping, tabulation, and storage of indicia for controlled guidance of compounding processes are intended to include both: (1) the application of mechanical and thermal compounding steps of generally uniform intensity but with varying density according to the strain distribution; and (2) mechanical and thermal compounding steps of varying intensity.

Furthermore as used in the specification and claims the reference to strain or strain distribution is intended to include the distribution of any parameter across the plane of the blank representative of the strain or easily derived from the strain including for example in addition to the strain parameter $\epsilon$, the strain related parameter $\lambda = 1 + \epsilon$, the inverse of the strain related parameter $\mu = 1\lambda$, the strain tensor, etc. .

Other objects, features and advantages of the invention are set forth in the following detailed specification of preferred example embodiments and accompanying drawings.

DESCRIPTION OF PREFERRED EXAMPLE EMBODIMENTS & BEST MOST OF THE INVENTION

Method of Differential Equations

Figure 1:
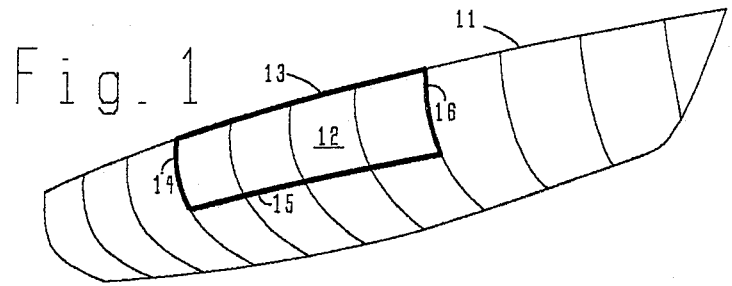
FIG. 1 is a diagrammatic perspective view of the idealized three-dimensional "surface" representing a generalized hull "shell structure" with a "patch" delineated on the three-dimensional surface by darkened boundary lines

A large number of numerical methods are known for the approximate solution of partial differential equations with appropriate boundary conditions such as the "fundamental strain equation" of the invention, Equation (4) or more generally Equation (8). For example, see Rice, J. R., [12], Chapter 10 for a summary of currently known methods such as methods of finite differences, finite elements, collocation, least squares, and Galerkin. These methods permit the solution of Problem A by differential equations derived from the fundamental strain equation.

The method of solving Problems A and B using differential equations begins by generating a mathematical description of the surface using a parametric surface description in parametric coordinates $u^1, u^2$ and obtaining two families of intersecting parametric lines or curves defining the surface. A mesh or set of representative coordinates are established at the intersecting parametric lines representative of the surface and boundaries of the patch. The mathematical description includes information establishing the metric tensor $g_{\alpha\beta}$ and Gaussian curvature $K(u^1, u^2)$ at the parametric coordinates $(u^1, u^2)$ of the patch.

The first method embodiment of the invention involves setting up the basic strain equation relating the required strain parameter $\epsilon$ to the intrinsic geometry of the patch as represented by the components of the metric tensor $g_{\alpha\beta}$ of the patch. The strain equation is solved for the strain parameter $\epsilon$ across the blank in the plane of the blank at the representative surface coordinates or nodal coordinates.

In implementing this method it should be noted that most compounding processes can only work in one direction. For example, peening can only make an expansion while line heating can only make a contraction. Consequently there are inequality constraints on $\epsilon$ which have to be recognized in practical application. These are handled by adjustment of the boundary conditions, based on the fact that $\epsilon$=constant is a homogenous solution of Eq. (4) or more generally Equation (8). If the compounding process is such that expansion only is possible ($\epsilon <= 0$), the procedure is as follows: (1) Solve the strain equation with $\epsilon = 0$ for boundary conditions. Call this solution $\epsilon_1$, and let $\epsilon_2$ be the maximum of $\epsilon_1$. (2) If $\epsilon_2 = 0$ then $\epsilon_1$ is a feasible solution satisfying the constraint. Otherwise, form $\epsilon_3 = (1+\epsilon_2)/(1+\epsilon_2) - 1$. $\epsilon_3$ is a new solution of Eq. (4) or more generally, Eq. (8) which is everywhere less than or equal to 0, therefore satisfying the constraint.

Following solution of Eq. (4) or Eq. (8) a suitable distribution of $\epsilon$ over P is specified which will map P onto a plane. The practical problem of compounding or implementing compounding processes is the reverse of this, requiring a known distribution of strain represented for example by $1/(1+\epsilon)$ to be applied over B. In order to locate these strains correctly on B, and more especially, in order to locate the boundaries of B, we require the whole geometry of B, i.e. the coordinates in the plane of B of any point designated by parameters $(u^1, u^2)$. Eq. (3) expresses this geometry in differential form, so the next task is one of integration: knowing the metric tensor $G_{\alpha\beta}$ of a plane surface, find a two-vector-valued function $\vec{X}(u^1, u^2)$ (the two components of $\vec{X}$ being the cartesian coordinates X,Y in the plane of the blank) satisfying $$\vec{X}_1 \cdot \vec{X}_1 = G_{11}, \quad \vec{X}_1 \cdot \vec{X}_2 = G_{12}, \quad \vec{X}_2 \cdot \vec{X}_2 = G_{22} \quad \text{Eq. (10)}$$

where single digit subscripts of $\vec{X}$ indicate first partial derivatives. Since $G_{\alpha\beta}$ is known to satisfy the equation of Gauss, and the curvature tensor of the plane surface B is identically zero, the existence of a solution is assured by the fundamental theorem as shown by Eisenhart, L. P., [10] Section 65. The solution is also unique up to its position in the plane.

The formulae of Gauss set forth in Kreyszig, E., [9], Eq. (45.14) in this case reduce to:

$$\vec{X}_{11} = \Gamma^1_{11} \cdot \vec{X}_1 + \Gamma^2_{11} \cdot \vec{X}_2 \quad \text{Eq. (11)}$$
$$\vec{X}_{12} = \Gamma^1_{12} \cdot \vec{X}_1 + \Gamma^2_{12} \cdot \vec{X}_2$$
$$\vec{X}_{22} = \Gamma^1_{22} \cdot \vec{X}_1 + \Gamma^2_{22} \cdot \vec{X}_2$$

a set of linear partial differential equations for $\vec{X}$, equivalent to Equation (10), the Christoffel symbols $\Gamma_{\alpha\beta}^\delta$ being expressible in terms of the components of $G_{\alpha\beta}$ and their partial derivatives with respect to $u^1, u^2$ as shown in Kreyszig, E., [9], Eq. 47.8. The double digit subscripts of $\vec{X}$ represent second partial derivatives. Along a parametric curve $$u^1 = f(t), \quad u^2 = g(t) \quad \text{Eq. (12)}$$

in the parameter plane Eq. (11) yields a system of 3 linear ordinary differential equations:

$$d\vec{X}/dt = f' \vec{X}_1 + g' \vec{X}_2 \quad \text{Eq. (13)}$$
$$d\vec{X}_1/dt = (f'\Gamma^1_{11} + g'\Gamma^1_{12})\vec{X}_1 + (f'\Gamma^2_{11} + g'\Gamma^2_{12})\vec{X}_2 \quad \text{Eq. (14)}$$
$$d\vec{X}_2/dt = (f'\Gamma^1_{12} + g'\Gamma^1_{22})\vec{X}_1 + (f'\Gamma^2_{12} + g'\Gamma^2_{22})\vec{X}_2 \quad \text{Eq. (15)}$$

These equations can be integrated by a variety of standard numerical algorithms for example as shown in Rice, J. R., [12], Chapter 9, starting from initial conditions at any arbitrary point $X_o$ where $t=0$:

$$\vec{X}(0) = \vec{X}_o, \quad \vec{X}_1 = \vec{X}_{10}, \quad \vec{X}_2(0) = \vec{X}_{20} \quad \text{Eq. (16)}$$

Only three of the six arbitrary constants implied in Eq. (16) can actually be chosen independently, since the derivatives have to satisfy the three conditions of Eq. (10). The remaining three degrees of freedom correspond to translation and rotation of B in the development plane.

By integrating the system of Equations (13)–(15) along a suitable path from $t=0$ to any final point $(u_i^1, u_i^2)$ the position in the plane of the corresponding point $\vec{X}$ is found. In particular, as many points as desired on the boundary of B can be found in this way. This method provides the solution of Problem B by differential equations, accurately delineating the boundaries for cutting a blank for compounding a plate applicable to a specified patch and with zero or minimal "field trim." A tabular flow chart summary of the "Method of Differential Equations" is set forth in TABLES 5A and 5B.

DIRECT FINITE ELEMENT METHOD

A more direct, flexible and conceptually simpler numerical solution of Problems A and B, the preferred embodiment of the invention, is the direct finite element solution.

First subdivide the patch P into a set of polygonal domains or elements, preferably triangular domains or elements. This can be done arbitrarily, but it is preferable to make the size and compactness of the elements reasonably uniform, avoiding elements that are unnecessarily long and narrow. The NN nodes where element corners meet may be identified by values of the parameters $(u_i^1, u_i^2)$ on both P and B if the surface has a parametric description. In this process, solve for the positions $(X_i, Y_i)$, $i=1 \ldots$ NN of the nodes in the plane of B, and simultaneously for the strain parameters $\epsilon_i$, $i=1 \ldots$ NN, associated with each of the nodes, a total of 3*NN unknowns. The solution obtained is approximate, but it converges rapidly toward the exact solution of the continuous method of differential equations previously set forth as the degree of subdivision is increased.

The focus of the calculation is on the distances between nodes in P and in B. Distances in P are measured by arc lengths of geodesic paths between the nodes. Consider one such "link" L connecting nodes N1 and N2 in P. During the mapping M the arc L maps into a curve L' in B, joining the images N1', N2' of the nodes in the plane of the blank. Although L' will not in general be a geodesic (i.e., straight line) in B, see Kreyszig, E., Theorem 95.1, its arc length in B will be closely approximated by the straight-line distance between N1' and N2' if it is sufficiently short. The length change that takes place from L to L' is determined by (1) the average value of the strain parameter between N1 and N2; and (2) if the strain pattern is not isotropic, by the orientation of the link L in the strain pattern. This relation is expressed by the "link equation":

$$(X_{N1}-X_{N2})^2 + (Y_{N1}-Y_{N2})^2 = [1+\tfrac{1}{2}(\epsilon_{N1}+\epsilon_{N2})A]^2 G \qquad \text{Eq. (17)}$$

where $X_{N1}, Y_{N1}$ are coordinates in the plane of B of node N1; $X_{N2}, Y_{N2}$ are coordinates in the plane of B of node N2; G is the geodesic length of the link in P; and A is the factor $(\cos^2\theta + E \sin^2\theta)$, from Eq. (6).

The left side of Eq. (17) is the square of the distance between the two nodes in B. The right side is the square of the geodesic distance, modified by the elongation in the direction of the link. An instance of Eq. (11) can be written for each of the NL links making up the grid. In this way NL simultaneous nonlinear equations in the 3*NN unknowns are set up.

It can be shown in general that 3*NN is greater than NL, so some additional equations are needed to obtain a unique solution. These are obtained by: (1) specification of $\epsilon$ at all boundary nodes (NB in number); and (2) removing three rigid body degrees of freedom by, for example, specifying X and Y for one node, then fixing the angular position of any other node relative to the fixed node. It can be shown by induction that NL+3=3*NN−NB for any plane triangular grid whatever, so the number of equations is equal to the number of unknowns.

The Newton-Raphson iteration is a well-known method for efficient numerical solution of systems of nonlinear equations as set forth in Rice, J. R. [12]. It produces a sequence of systems of linear equations, whose solutions are successive approximations to the nonlinear solution. In this case, since each of the link equations involves at most 6 unknowns, the linear equations are extremely sparse, a property which can be usefully exploited in computer storage and solution as further explained in Duff, I. S. et al. [19].

The values of $\epsilon_i$ obtained for the interior nodes are the solution of Problem A. The coordinates $X_i, Y_i$ obtained for the boundary nodes give a series of points outlining the boundary of the blank, providing the solution of Problem B. A tabular flow chart summary of the preferred "Direct Finite Element Method" is set forth in TABLE 6.

Method of Geodesic Parallel Coordinates For Unidirectional Strain

A third embodiment of the invention is applied to the case of unidirectional strain (E=0). This alternative numerical solution is appropriate to unidirectional forming processes such as line heating.

Cover the patch P with a field of geodesics GF and introduce geodesic parallel coordinates as described in Kreyszig, E., [9], Sec. 52, by the following procedure:
(1) Between two arbitrary points P1 and P2 on opposite sides or corners of P, establish an arbitrary smooth curve G1. G1 might be advantageously selected to be a geodesic; to meet the boundary lines of P orthogonally; or as a "parallel" when the surface is a surface of revolution.

(2) From any point on G1, shoot a geodesic in the direction orthogonal to G1.

(3) The parameter $v^2$ is arc length along G1, measured from P1. This parameter labels the various members of GF.

(4) The parameter $v^1$ is arc length along any member of GF, measured from G1.

The metric tensor for the parameters $v^1, v^2$ has the form $$g_{11}=1, \; g_{12}=g_{21}=0, \; g_{22}=\mu^2$$

and following Kreyszig, E., Eq. 52.2', substituting in the equation of Gauss produces:

$$-\frac{1}{\mu}\frac{\partial^2 \mu}{\partial(v^1)^2} = K(v^1, v^2) \qquad \text{Eq. (18)}$$

which corresponds to Eq. (8).

If $K(v^1,v^2)$ is known, Eq. (15) is a partial differential equation for $\nu$ where $\nu=1/(1+\epsilon)$. It is a parabolic equation of particularly simple type, the second parameter $v^2$ being present only in the variable coefficient K. Along any parametric line $v^2=$constant, Eq. (18) produces a second-order ordinary differential equation:

$$d^2\mu/(dv^1)^2 + K(v^1,v^2)\mu = 9 \qquad \text{Eq. (19)}$$

which can be solved by standard methods set forth in Rice, J. R., [12], Chapter 9, applying the two boundary conditions:

$$\mu=0 \text{ and } d\mu/dv^1=f(v^2) \text{ at } v^1=0 \qquad \text{Eq. (20)}$$

where $f(v^2)$ is the geodesic curvature of G1 at $(0,v^2)$.

Mapping of P onto the plane domain B is accomplished by unidirectional strain in the $v^2$ direction, by the amount $\epsilon=(1/\mu)-1$. Preferably, this may be accomplished by a pattern of heat lines oriented parallel to the geodesics of GF. This produces a plane development in which the image of GF is a family of straight lines $v^2=$constant. Arc length is preserved along these lines; also arc length and geodesic curvature of the line G1 are preserved. If G1 is a geodesic then the parameters $v^1, v^2$ form Cartesian coordinates in the plane.

The calculation of $\mu$ from Eqs. (19) and (20) along a series of lines comprises the solution of Problem A. For example, μ is used to specify the density of heat lines in each area of the plate. Laying out boundary points by their $v^1,v^2$ parameters on the plane of development comprises the solution of Problem B according to this third method embodiment of the invention. A tabular flow chart summary of the "Method of Geodesic Parallel Coordinates for Unidirectional Strain" is set forth in TABLE 7.

Example 1: Hull Surface and Hull Surface Patch

Figure 10:
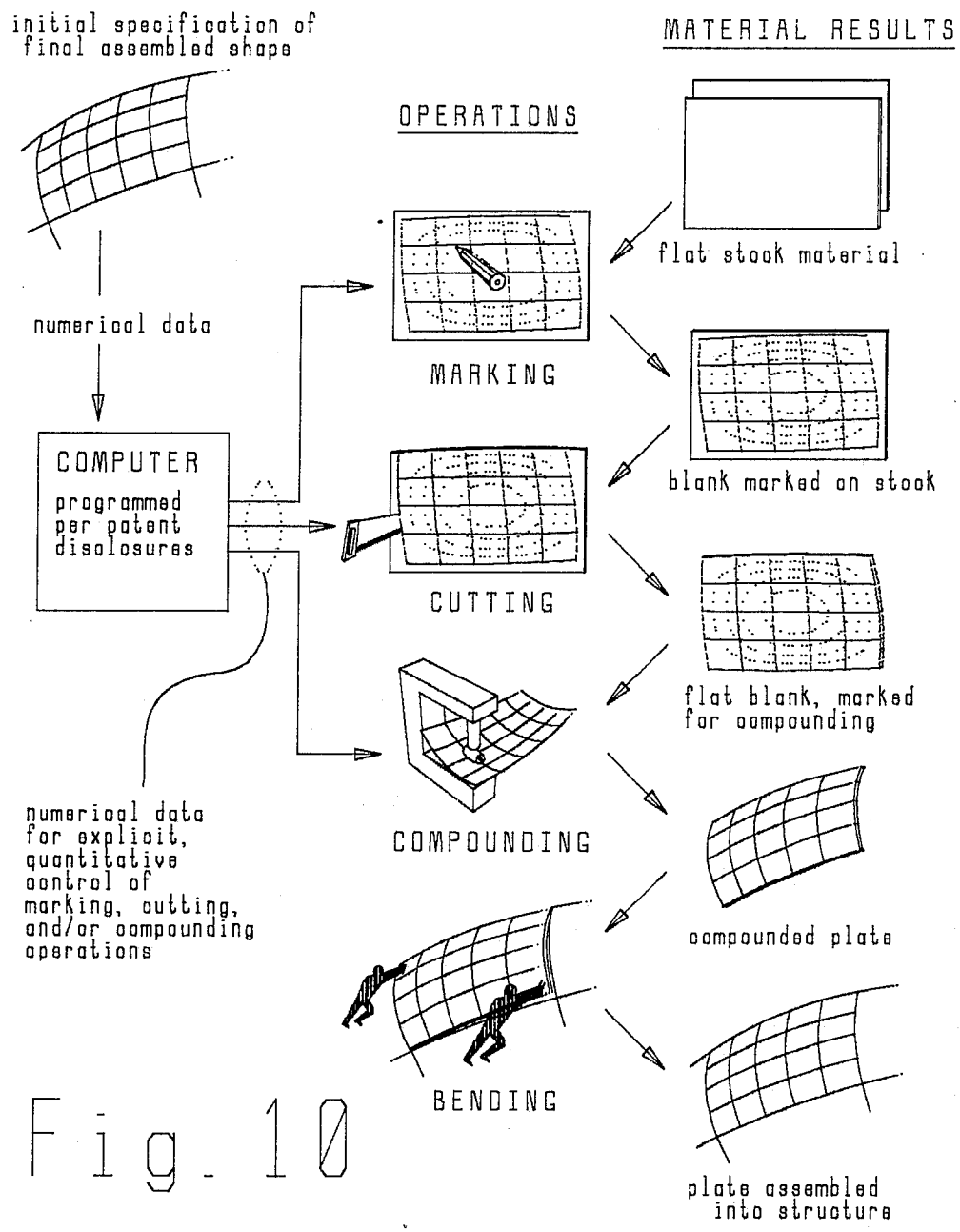
FIG. 10 is a system flow diagram illustrating both method and apparatus according to the invention for lofting and cutting a flat starting blank and for transforming the blank by compounding into a plate applicable in both boundary lines and Gaussian curvature to a patch on a surface of non-zero Gaussian curvature.

The generalized implementation of the various embodiments of the invention is illustrated in the system method and apparatus flow diagram of FIG. 10. Each of the foregoing steps according to the invention as summarized in the "Disclosure of the Invention" is set forth with brief accompanying identifying commentary. It is apparent that the invention may be carried out by either manual or automated steps.

For example, the marking and cutting of the blank according to the invention may be carried out manually or by numerically controlled methods. The illustrated incremental compounding process of FIG. 10 is roller planishing. The final compounded plate applicable to the patch may require a final bending into place which does not change the intrinsic geometry and non-zero Gaussian curvature of the plate. As illustrated, no field trim is required in the final fabrication of the plate in the shell structure.

Figure 11:
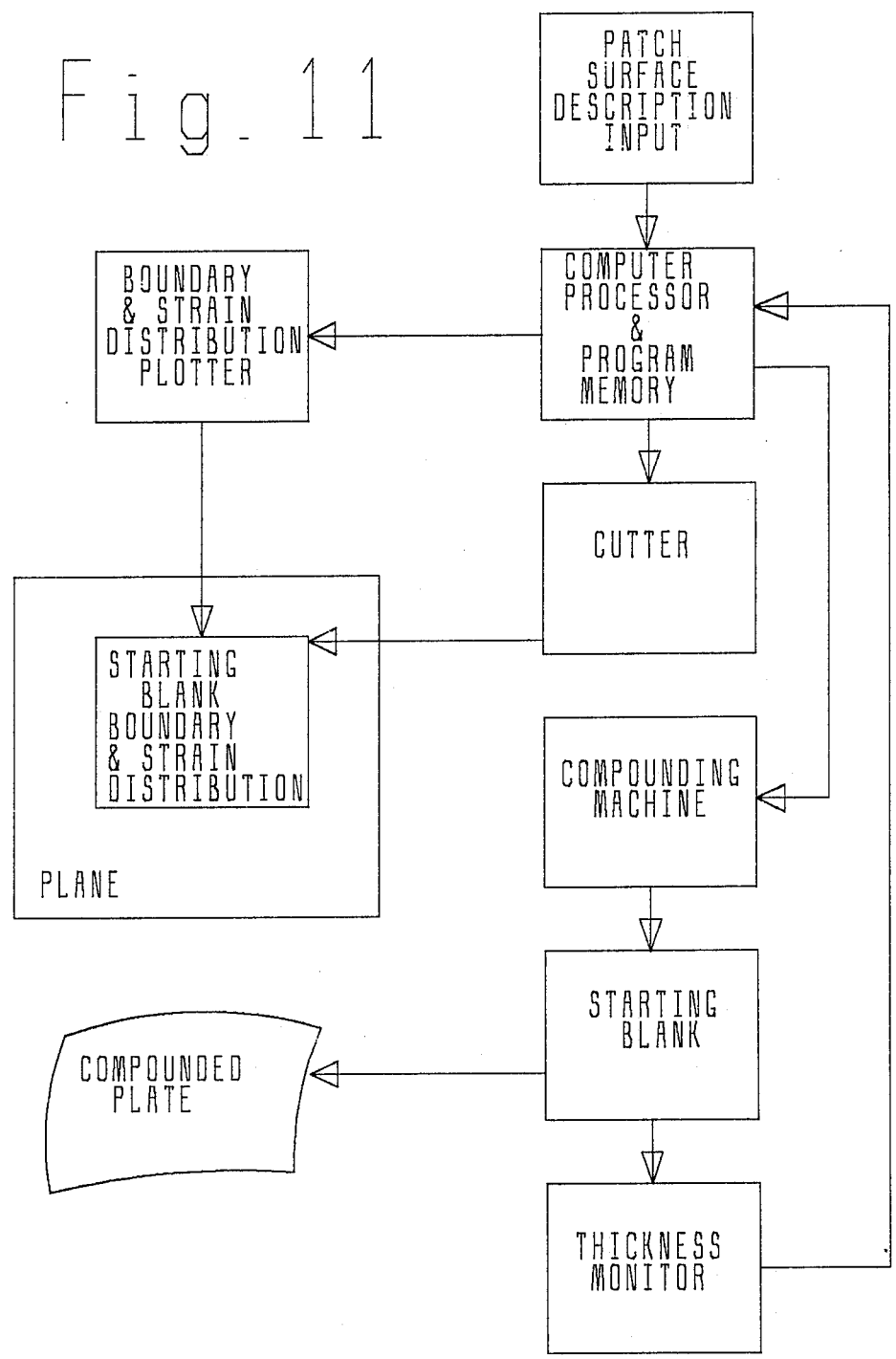
FIG. 11 is a system block diagram of the method and apparatus for the invention.

The system block diagram for carrying out the foregoing embodiments including thickness monitoring is set forth in FIG. 11. Detailed examples for lofting and cutting of blanks and for compounding of blanks into plates using the preferred direct finite method of the invention are as follows.

FIG. 1 illustrates an idealized three-dimensional "surface" 11 representing a hull "shell structure" with a "patch" 12 delineated on the three-dimensional surface 11 by the darkened boundary lines 13, 14, 15 and 16. A detailed diagrammatic perspective view of the patch 12 from the hull surface 11 of FIG. 1 is shown with a mesh of parametric coordinate lines 19, 20 in the coordinate system $u^1,u^2$ superimposed on the patch 12 for defining the set of nodes or nodal points 18 with coordinates $u^1,u^2$ representative of the surface of the patch.

Figure 2:
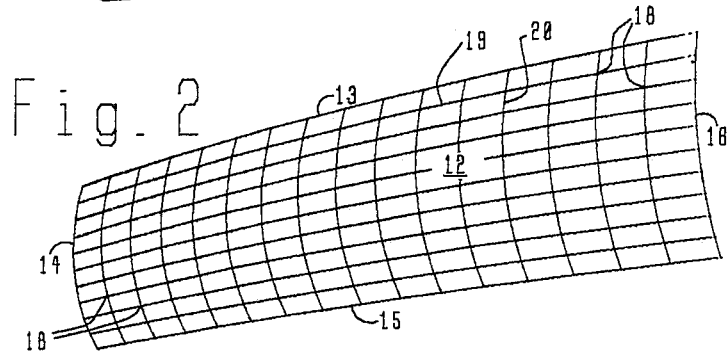
FIG. 2 is a detailed fragmentary diagrammatic perspective view; of the "patch" from the generalized hull surface of FIG. 1 with a mesh of parametric coordinate lines superimposed on the patch for defining the set of nodes or nodal points representative of the surface of the patch.
Figure 3:
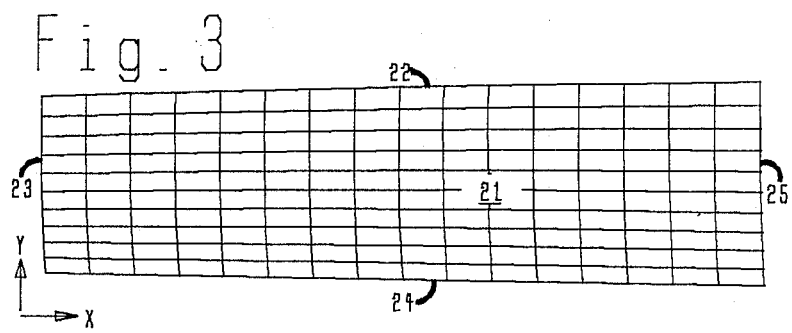
FIG. 3 is a two-dimensional diagrammatic representation of the flat starting blank in the development plane with specified boundaries where it is to be cut for compounding into a plate applicable to the patch of FIG. 2.

Mapping the patch 12 of FIG. 2 on to the development plane is accomplished by setting up the strain equation using the Gaussian relationships of intrinsic geometry and using a mapping equation or mapping relationship appropriate to the selected compounding process. The strain distribution obtained by solving the basic strain equation is used for controlled compounding of the blank into a plate applicable to the three-dimensional patch 12 of non-zero Gaussian curvature illustrated in FIG. 2. After solving the strain equation, the flat starting blank 21 is specified by image coordinates within the two-dimensional development plane. These coordinates are obtained by numerical integration of the formulae of Gauss. Boundary image coordinates specify the boundaries 22, 23, 24, and 25 where the blank is to be cut.

Figure 4:
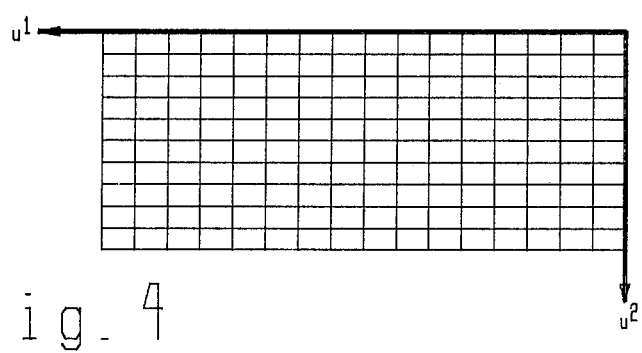
FIG. 4 is a diagrammatic plan view of the two-dimensional parametric space for defining the surface of a three-dimensional structure as a two-dimensional surface manifold embedded in a three-dimensional space.
Figure 5:
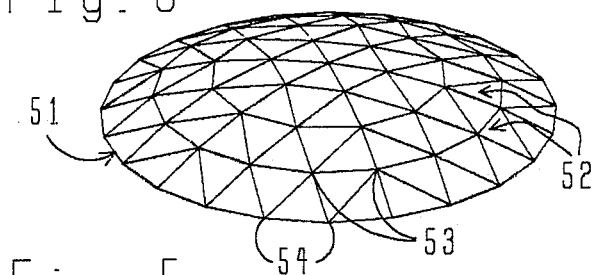
FIG. 5 is a diagrammatic perspective view of a spherical cap patch with a triangular mesh of triangular elements superimposed over the patch defining a set of nodes or nodal points $(u_i^1, u_i^2)$ representative of the surface for mapping onto a flat blank in the development plane according to the methods of the present invention.
Figure 5A:
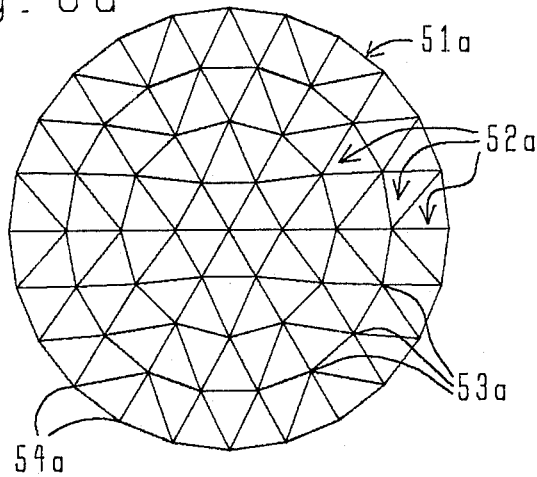
FIG. 5A is a diagrammatic perspective view of the flat starting blank expanded or lofted from the spherical cap plate of FIG. 5 according to the steps of the present invention and showing the mapping of nodes or nodal point coordinates $(u_i^1, u_i^2)$ from the spherical cap plate to the image coordinates $(X_i, Y_i)$ of the blank including boundary nodes specifying the boundary of the blank.

The two-dimensional parametric space $u^1,u^2$ used for defining a patch of a surface such as surface 11 representing a three-dimensional structure, is illustrated in FIG. 4. In the parametric description or parametric coordinate space the surface is represented as a two-dimensional surface manifold described by the coordinates $u^1,u^2$ embedded in a three-dimensional space.

EXAMPLE 2: SPHERE AND SPHERICAL CAP PATCH

The spherical cap 51 is a patch from the surface of a sphere and provides an example of the method of finite elements according to the invention for mapping the spherical patch on to a plane representing the plane of a blank. A triangular mesh is applied over the surface of the spherical cap 51 with triangle elements 52 meeting at the corners 53 of the triangle elements. The nodal points 53 are selected to coincide with the corners of the triangular elements 52 as set forth in the description of the finite element method above. Nodes 54 at the edge of the patch 52 define the boundary.

Using the finite element method described above, the patch 51 is mapped on to the development plane forming a generally circular blank 51a having triangular element images 52a, nodal points or coordinates 53a and boundary nodes 54a which define the boundary of the blank 51a.

In each instance, whichever of the three method embodiments of the invention is used, the equations are set up that relate the strain required for mapping the 3-D surface on to a 2-D plane image to the intrinsic geometry of the 3-D surface. The equations are solved for the strain distribution or distribution of strain parameters at the selected nodes or nodal points across the blank.

EXAMPLE 3: UNIDIRECTIONAL COMPOUNDING

Figure 6:
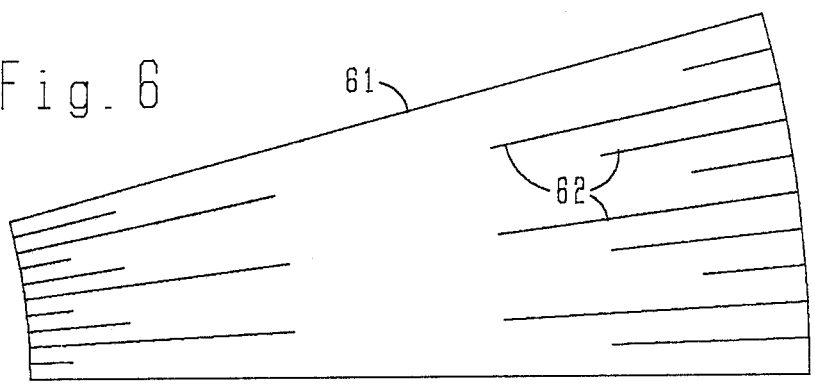
FIG. 6 is a diagrammatic plan view of a strain diagram on a blank expanded or lofted from a plate according to the present invention showing the tracks or track lines and track line density for applying line heating compounding processes for accurate and controlled introduction of strain to achieve a plate with a specified distribution of non-zero Gaussian curvature.

As illustrated in FIG. 6, the strain distribution may be represented by marks or indicia directly on the blank 61 as illustrated in FIG. 6. In this example, the marks or indicia are tracks or lines 62. The track line density provides the guiding or controlling information for applying line heating or other unidirectional compounding processes for controlled introduction of the strain necessary to achieve a desired 3-D plate configuration. The strain diagram or line density mapping need not necessarily be applied directly to the blank 61 but may be stored for example in computer memory or in program instructions for automated control of the introduction of strain on a blank in accordance with the strain distribution solved from the set-up equations.

Figure 7:
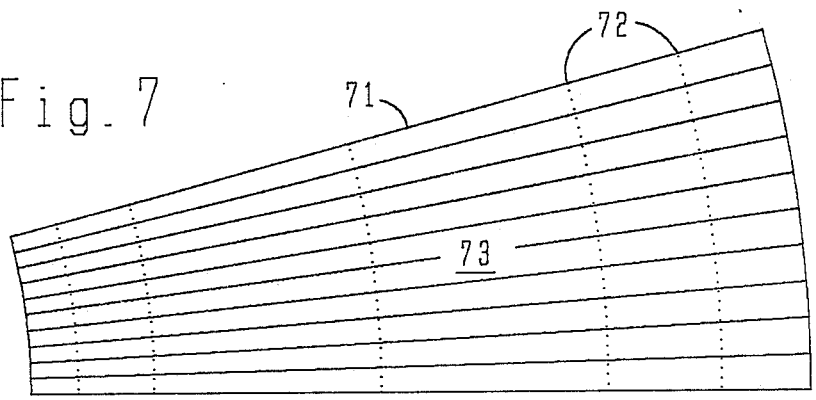
FIG. 7 is a diagrammatic plan view of an alternative strain diagram showing isostrain contours indicating line density for application of line heating compounding processes.

The distribution of strain solved from the set-up equations may be represented in lieu of a density map by isostrain contours or contour lines 72 as shown on the blank 71 of FIG. 7. In the case of a unidirectional compounding process such as line heating, the heating lines 73 may then be constructed using the isostrain contours 72. In either event, the strain distribution information may be recorded directly on the blank for manual or semi-automated compounding processes or in computer memory, control programs, etc. for automated control of the compounding apparatus and compounding method.

EXAMPLE 4: ISOTROPIC COMPOUNDING PROCESSES

Figure 8:
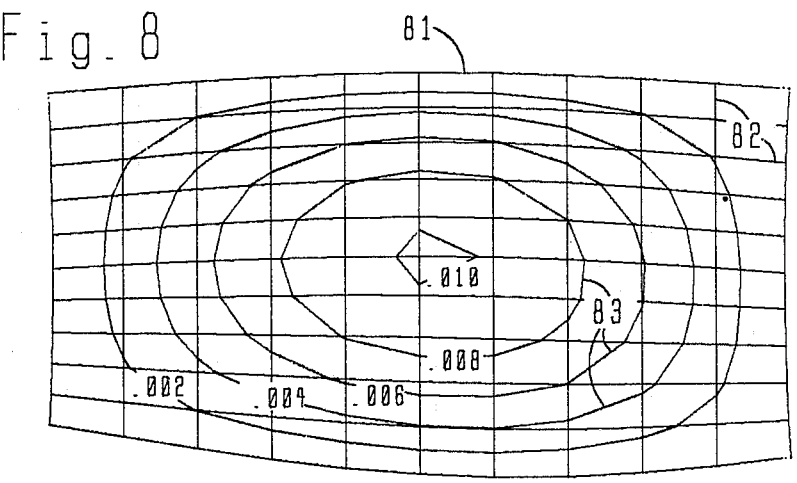
FIG. 8 is a diagrammatic plan view of an alternative strain diagram showing isostrain contours indicating the density of peening or planishing for application of peening or planishing compounding processes for introducing positive Gaussian curvature.

A patch 81 having positive non-zero Gaussian curvature represented by parametric coordinate lines 82 is illustrated in FIG. 8. In this example, isotropic strain is introduced by a peening or planishing compounding process. In this example the strain diagram is in the form of isostrain contour lines 83 indicating the density of peening or planishing steps to introduce the desired positive Gaussian curvature. In this example of positive curvature the greatest density of peening or planishing steps is in the center tapering to a lower density at the outer parameter contour line. If the isostrain contour strain diagram is not represented directly on the blank, it may be represented by for example tables, indices, instructions or programs in computer memory for automated control of an isotropic compounding process.

EXAMPLES 5, 6 & 7: THE WIGLEY HULL

Complete examples are given of plate expansion and strain distribution solutions for each of the three embodiments of the invention. The surface utilized for each example is an idealized ship hull form commonly used in hydrodynamic calculations and known as the "Wigley Hull." The parametric equations for this surface are $$x = u^1 \quad y = (B/2)[1 - (2u^2/L)^2][1 - (u^2/D)^2] \quad z = u^2 \qquad \text{Eq. (21)}$$

where L=overall length; B=maximum beam; D=depth. We make the particular selection of dimensions: L=10 units; B=2 units; D=1 unit.

The Gaussian curvature of this surface is partly positive and partly negative, as indicated in Table 1.

EXAMPLE 5: PLATE EXPANSION FOR ISOTROPIC STRAIN

The surface for Example 5 is the Wigley Hull, as defined by Eq. (21). The patch is a rectangle in parameter space, specified by $-2.5 \leq x \leq 0$, $0 \leq z \leq 1.0$. The strain equation for isotropic strain, Eq. (4), with a zero boundary condition, is solved by a finite difference method on a uniformly spaced $10 \times 10$ mesh in parameter space, with the results given in Table 1A. The largest required strain, near the middle of the plate, is $-0.0081$. This means that in going from the plate to the blank, this part of the plate has to undergo an isotropic shrinkage of 0.81%; in going from the blank to the plate, this part has to undergo an isotropic expansion of 0.81%. This strain would be accompanied by a thickness reduction of 1.61%.

Coordinates of the mesh points in the plane of development are obtained by integration of the formulae of Gauss along parametric lines by a predictor-corrector method, utilizing the strains in Table 1A. The results are shown in Table 1B. For example, the four corners are at (0,0), (2.513, 0.107), (2.364, 1.578), and (−0.119, 1.294). The coordinates around the boundary of this table would be used for lofting the blank.

EXAMPLE 6: FINITE ELEMENT PLATE EXPANSION FOR ANISOTROPIC STRAIN

Figure 9:
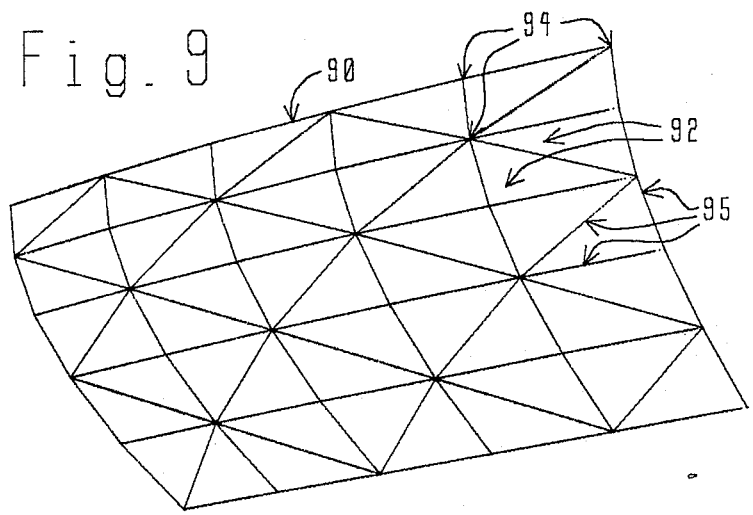
FIG. 9 is a diagrammatic perspective representation of the patch from the Wigley hull showing the subdivision of the patch into triangular finite elements and also showing the nodes and lengths.

The surface for Example 6 is the Wigley hull as defined by Eq. (21). The patch 90 is a rectangle in parameter space, specified by $-2.5 < x < 0$, $0 < z < 1.0$. (This is the same patch as in Example 5). For Example 6, the direct finite element solution is used. The nodal points 94 are a $5 \times 5$ mesh, uniformly spaced in the parameters, with alternating diagonal links 95 forming triangular elements 92 as shown on the patch 90 in FIG. 9. There are 36 nodes 94 and 85 links 95 forming the triangular elements 92 on the Wigley hull patch 90. An anisotropic compounding process is specified characterized by E=0.5, aligned along the coordinate lines x=constant; i.e., the anisotropy factor A in Eq. (11) is 1.00 for the vertical links, approximately 0.50 for the horizontal links, and ranges from approximately 0.60 to 0.70 for the diagonal links. Zero strain is specified on the 20 boundary nodes.

With 36 nodes, each having unknown X and Y coordinates, and 16 interior nodes, each having one unknown strain parameter, the number of unknowns totals 88. The 85 link equations are supplemented by requiring both X=0 and Y=0 for the corner node at (0,0), and Y=0 for the corner node at (2.5, 0).

The 88 equations are solved by Newton-Raphson iteration, with the results stated in Table 2A. The four corners are located at (0,0), (2.508,0.205), (2.429,1.476), and (−0.064, 1.298). The largest strain of −0.012 occurs near the middle. This indicates that going from the plate to the blank requires a shrinkage in the z-direction of 1.20% (accompanied by shrinkage in the x-direction of 0.60%) in this area. Conversely, compounding the plate from a flat blank requires expansions of 1.20% and 0.60% in the z- and x-directions respectively. This would be accompanied by a thickness reduction of about 1.80%.

EXAMPLE 7: PLATE EXPANSION FOR UNIDIRECTIONAL STRAIN

The surface for Example 7 is the Wigley hull as defined by Eq. (21). The patch is a rectangle in parameter space, specified by $-2.5 \leq x < 2.5$, $0 \leq z \, 1$. Note that the upper and lower boundary lines are both geodesics. Using the fore and aft symmetry which is inherent in the surface, we need to expand only half the patch, taken as the portion in positive x.

The special curve G1 is selected as the midship section line x=0, which is a geodesic. We shoot geodesics normal to G1 at the points x=0, z=0 to 1, step 0.1. Parametric coordinates (x,z) for these geodesic lines are shown in Table 3A, tabulated at equal intervals (0.25) of arc length, except for the last point on each line, which is located where the line crosses the boundary.

Since G1 is a geodesic, its image G1′ in the plane of development is a straight line, having length equal to the arc length of G1. Let G1′ lie along the Y-axis in the plane of development. Plane expansion of the plate consists of laying off 11 lines from G1′, each parallel to X-axis, having lengths equal to the arc lengths found in the last column of Table 3A. Their spacing in the Y- direction is in accordance with the arc length of their starting points along G1, as shown in Table 3B. For example, the four corners of the blank are at (0, 0), (2.517, 0), 2.500, 1.489, and (0, 1.489).

The strain required to transform the blank into a curved surface applicable to the patch is determined by integrating Eq. (16) along each geodesic line. This strain is expressed in Table 3C in terms of $\mu$, the ratio of distance in the formed plate to distance on the blank. For example, at the most extreme location x=2.50, z=0 (the upper right entry in the table), $\mu$ is 0.543, indicating that a small element of the blank in this area has to be shrunk to 54.3% of its original size in forming the plate. This would be accompanied by an 84% increase in thickness. These extreme strains, which are unrealistically large for line heating, have resulted from selecting such a large portion of the original surface for a single plate.

TABLE 1

Gaussian Curvature K Distribution of Wigley Hull Surface for Example 5, 6, 7

| Z/X | −5.00 | −4.50 | −4.00 | −3.50 | −3.00 | −2.50 | −2.00 | −1.50 | −1.00 | −0.50 | 0.00 |
|---|---|---|---|---|---|---|---|---|---|---|---|
| 0.00 | +.000 | +.024 | +.047 | +.070 | +.092 | +.111 | +.128 | +.141 | +.152 | +.158 | +.160 |
| 0.10 | −.005 | +.020 | +.043 | +.066 | +.086 | +.104 | +.119 | +.131 | +.140 | +.145 | +.146 |
| 0.20 | −.019 | +.007 | +.031 | +.053 | +.071 | +.086 | +.097 | +.105 | +.110 | +.113 | +.114 |
| 0.30 | −.045 | −.015 | +.012 | +.034 | +.051 | +.062 | +.070 | +.074 | +.077 | +.078 | +.079 |
| 0.40 | −.083 | −.046 | −.013 | +.012 | +.029 | +.039 | +.045 | +.048 | +.049 | +.050 | +.050 |
| 0.50 | −.135 | −.087 | −.042 | −.010 | +.009 | +.020 | +.025 | +.028 | +.029 | +.030 | +.030 |
| 0.60 | −.203 | −.137 | −.073 | −.031 | −.007 | +.006 | +.012 | +.015 | +.016 | +.017 | +.017 |
| 0.70 | −.289 | −.196 | −.104 | −.048 | −.018 | −.004 | +.003 | +.007 | +.008 | +.009 | +.009 |
| 0.80 | −.393 | −.261 | −.133 | −.061 | −.026 | −.010 | −.002 | +.002 | +.003 | +.004 | +.005 |
| 0.90 | −.512 | −.329 | −.158 | −.070 | −.031 | −.013 | −.005 | −.001 | +.001 | +.001 | +.002 |
| 1.00 | −.640 | −.396 | −.178 | −.075 | −.033 | −.015 | −.007 | −.003 | −.001 | −.000 | +.000 |

TABLE 1A

Solution of Isotropic Strain Distribution of Example 5
Tabulated Quantity is the Strain Parameter $\epsilon$

| Z/X | −2.25 | −2.00 | −1.75 | −1.50 | −1.25 | −1.00 | −0.75 | −0.50 | −0.25 |
|---|---|---|---|---|---|---|---|---|---|
| 0.1 | −.0021 | −.0029 | −.0034 | −.0037 | −.0038 | −.0038 | −.0037 | −.0033 | −.0025 |
| 0.2 | −.0032 | −.0047 | −.0056 | −.0060 | −.0063 | −.0063 | −.0060 | −.0053 | −.0038 |
| 0.3 | −.0036 | −.0056 | −.0067 | −.0073 | −.0077 | −.0076 | −.0073 | −.0063 | −.0043 |
| 0.4 | −.0035 | −.0056 | −.0070 | −.0077 | −.0081 | −.0081 | −.0076 | −.0065 | −.0042 |
| 0.5 | −.0031 | −.0052 | −.0066 | −.0074 | −.0078 | −.0078 | −.0072 | −.0060 | −.0038 |
| 0.6 | −.0024 | −.0043 | −.0057 | −.0065 | −.0069 | −.0069 | −.0064 | −.0052 | −.0032 |
| 0.7 | −.0017 | −.0033 | −.0045 | −.0052 | −.0056 | −.0056 | −.0051 | −.0041 | −.0025 |
| 0.8 | −.0011 | −.0022 | −.0031 | −.0037 | −.0040 | −.0040 | −.0036 | −.0029 | −.0017 |
| 0.9 | −.0005 | −.0010 | −.0015 | −.0019 | −.0021 | −.0021 | −.0019 | −.0015 | −.0009 |

TABLE 1B

Mesh Point Coordinates in the Plane Of Development for Example 5

| X | −0.1199 | 0.377 | 0.874 | 1.371 | 1.867 | 2.364 |
|---|---|---|---|---|---|---|
| Y | 1.294 | 1.353 | 1.412 | 1.469 | 1.524 | 1.578 |
| X | −0.079 | 0.420 | 0.918 | 1.415 | 1.912 | 2.408 |
| Y | 0.960 | 0.993 | 1.032 | 1.073 | 1.118 | 1.169 |
| X | −0.046 | 0.456 | 0.954 | 1.452 | 1.948 | 2.445 |
| Y | 0.671 | 0.687 | 0.711 | 0.741 | 0.779 | 0.826 |
| X | −0.022 | 0.482 | 0.983 | 1.480 | 1.977 | 2.473 |
| Y | 0.423 | 0.428 | 0.443 | 0.466 | 0.501 | 0.544 |
| X | −0.006 | 0.500 | 1.003 | 1.501 | 1.998 | 2.496 |
| Y | 0.203 | 0.205 | 0.217 | 0.237 | 0.269 | 0.311 |
| X | 0.000 | 0.508 | 1.013 | 1.515 | 2.015 | 2.513 |
| Y | 0.000 | 0.002 | 0.013 | 0.034 | 0.065 | 0.107 |

TABLE 2A

Solutions for Anisotropic Strain, E = 0.5, for Example 6
X, Y: Nodal Coordinates in the Plane of Development
EPS: Strain Parameter $\epsilon$

| X | −0.064 | 0.434 | 0.933 | 1.432 | 1.930 | 2.429 |
|---|---|---|---|---|---|---|
| Y | 1.298 | 1.335 | 1.372 | 1.408 | 1.443 | 1.476 |
| EPS | +.0000 | +.0000 | +.0000 | +.0000 | +.0000 | +.0000 |
| X | −0.039 | 0.462 | 0.960 | 1.460 | 1.958 | 2.457 |
| Y | 0.962 | 0.974 | 0.990 | 1.011 | 1.035 | 1.066 |
| EPS | +.0000 | −.0027 | −.0042 | −.0044 | −.0031 | +.0000 |
| X | −0.019 | 0.484 | 0.984 | 1.482 | 1.980 | 2.479 |
| Y | 0.673 | 0.667 | 0.668 | 0.679 | 0.696 | 0.721 |
| EPS | +.0000 | −.0058 | −.0086 | −.0092 | −.0063 | +.0000 |
| X | −0.005 | 0.499 | 1.000 | 1.500 | 1.997 | 2.495 |
| Y | 0.423 | 0.407 | 0.401 | 0.404 | 0.416 | 0.439 |
| EPS | +.0000 | −.0080 | −.0120 | −.0117 | −.0093 | +.0000 |
| X | 0.002 | 0.508 | 1.011 | 1.510 | 2.009 | 2.508 |
| Y | 0.203 | 0.185 | 0.175 | 0.175 | 0.186 | 0.205 |
| EPS | +.0000 | −.0083 | −.0088 | −.0113 | −.0074 | +.0000 |
| X | 0.000 | 0.508 | 1.012 | 1.515 | 2.016 | 2.515 |
| Y | 0.000 | −0.017 | −0.028 | −0.028 | −0.018 | −0.000 |
| EPS | +.0000 | +.0000 | +.0000 | +.0000 | +.0000 | +.0000 |

TABLE 3A

Geodesic Lines on Wigley Hull Patch for Example 7
S = Arc Length From G1
(X,Z) = Parametric Coordinates x, z

| 9 | 0.000 | 0.250 | 0.500 | 0.750 | 1.000 | 1.251 | 1.501 | 1.751 | 2.001 | 2.252 | 2.502 | 2.517 |
|---|---|---|---|---|---|---|---|---|---|---|---|---|
| X | 0.000 | 0.250 | 0.500 | 0.750 | 0.999 | 1.249 | 1.497 | 1.745 | 1.993 | 2.240 | 2.486 | 2.500 |
| Z | 0.000 | 0.000 | 0.000 | 0.000 | 0.000 | 0.000 | 0.000 | 0.000 | 0.000 | 0.000 | 0.000 | 0.000 |
| S | 0.000 | 0.250 | 0.500 | 0.750 | 1.000 | 1.251 | 1.501 | 1.751 | 2.001 | 2.252 | 2.502 | 2.516 |
| X | 0.000 | 0.250 | 0.500 | 0.750 | 0.999 | 1.249 | 1.497 | 1.746 | 1.993 | 2.240 | 2.486 | 2.500 |
| Z | 0.100 | 0.100 | 0.098 | 0.096 | 0.093 | 0.088 | 0.083 | 0.078 | 0.072 | 0.065 | 0.057 | 0.057 |
| S | 0.000 | 0.250 | 0.500 | 0.750 | 1.000 | 1.250 | 1.501 | 1.751 | 2.001 | 2.252 | 2.502 | 2.515 |

TABLE 3A-continued

Geodesic Lines on Wigley Hull Patch for Example 7
S = Arc Length From G1
(X,Z) = Parametric Coordinates x, z

| | | | | | | | | | | | |
|---|---|---|---|---|---|---|---|---|---|---|---|
| X | 0.000 | 0.250 | 0.500 | 0.750 | 0.999 | 1.249 | 1.498 | 1.746 | 1.994 | 2.241 | 2.488 | 2.500 |
| Z | 0.200 | 0.199 | 0.197 | 0.193 | 0.187 | 0.180 | 0.171 | 0.160 | 0.149 | 0.136 | 0.122 | 0.121 |
| S | 0.000 | 0.250 | 0.500 | 0.750 | 1.000 | 1.250 | 1.501 | 1.751 | 2.001 | 2.251 | 2.502 | 2.513 |
| X | 0.000 | 0.250 | 0.500 | 0.750 | 1.000 | 1.249 | 1.498 | 1.747 | 1.995 | 2.243 | 2.489 | 2.500 |
| Z | 0.300 | 0.299 | 0.296 | 0.291 | 0.284 | 0.275 | 0.264 | 0.250 | 0.235 | 0.218 | 0.199 | 0.198 |
| S | 0.000 | 0.250 | 0.500 | 0.750 | 1.000 | 1.250 | 1.500 | 1.751 | 2.001 | 2.251 | 2.502 | 2.510 |
| X | 0.000 | 0.250 | 0.500 | 0.750 | 1.000 | 1.249 | 1.499 | 1.748 | 1.996 | 2.244 | 2.492 | 2.500 |
| Z | 0.400 | 0.399 | 0.396 | 0.391 | 0.383 | 0.374 | 0.362 | 0.348 | 0.331 | 0.312 | 0.291 | 0.290 |
| S | 0.000 | 0.250 | 0.500 | 0.750 | 1.000 | 1.250 | 1.500 | 1.750 | 2.001 | 2.251 | 2.501 | 2.507 |
| X | 0.000 | 0.250 | 0.500 | 0.750 | 1.000 | 1.250 | 1.499 | 1.748 | 1.997 | 2.246 | 2.494 | 2.500 |
| Z | 0.500 | 0.499 | 0.496 | 0.491 | 0.485 | 0.476 | 0.465 | 0.451 | 0.435 | 0.416 | 0.395 | 0.394 |
| S | 0.000 | 0.250 | 0.500 | 0.750 | 1.000 | 1.250 | 1.500 | 1.750 | 2.000 | 2.250 | 2.501 | 2.504 |
| X | 0.000 | 0.250 | 0.500 | 0.750 | 1.000 | 1.250 | 1.499 | 1.749 | 1.998 | 2.248 | 2.496 | 2.500 |
| Z | 0.600 | 0.599 | 0.597 | 0.593 | 0.587 | 0.580 | 0.570 | 0.558 | 0.544 | 0.528 | 0.508 | 0.508 |
| S | 0.000 | 0.250 | 0.500 | 0.750 | 1.000 | 1.250 | 1.500 | 1.750 | 2.000 | 2.250 | 2.500 | 2.503 |
| X | 0.000 | 0.250 | 0.500 | 0.750 | 1.000 | 1.250 | 1.500 | 1.749 | 1.999 | 2.249 | 2.498 | 2.500 |
| Z | 0.700 | 0.699 | 0.698 | 0.694 | 0.690 | 0.684 | 0.677 | 0.668 | 0.657 | 0.644 | 0.628 | 0.628 |
| S | 0.000 | 0.250 | 0.500 | 0.750 | 1.000 | 1.250 | 1.500 | 1.750 | 2.000 | 2.250 | 2.500 | 2.501 |
| X | 0.000 | 0.250 | 0.500 | 0.750 | 1.000 | 1.250 | 1.500 | 1.750 | 2.000 | 2.249 | 2.499 | 2.500 |
| Z | 0.800 | 0.800 | 0.798 | 0.796 | 0.793 | 0.789 | 0.784 | 0.778 | 0.771 | 0.762 | 0.751 | 0.751 |
| S | 0.000 | 0.250 | 0.500 | 0.750 | 1.000 | 1.250 | 1.500 | 1.750 | 2.000 | 2.250 | 2.500 | 2.500 |
| X | 0.000 | 0.250 | 0.500 | 0.750 | 1.000 | 1.250 | 1.500 | 1.750 | 2.000 | 2.250 | 2.500 | 2.500 |
| Z | 0.900 | 0.900 | 0.899 | 0.898 | 0.897 | 0.895 | 0.892 | 0.889 | 0.885 | 0.881 | 0.875 | 0.875 |
| S | 0.000 | 0.250 | 0.500 | 0.750 | 1.000 | 1.250 | 1.500 | 1.750 | 2.000 | 2.250 | 2.500 | 2.500 |
| X | 0.000 | 0.250 | 0.500 | 0.750 | 1.000 | 1.250 | 1.500 | 1.750 | 2.000 | 2.250 | 2.500 | 2.500 |
| Z | 1.000 | 1.000 | 1.000 | 1.000 | 1.000 | 1.000 | 1.000 | 1.000 | 1.000 | 1.000 | 1.000 | 1.000 |

TABLE 3B

Location of Geodesic Lines in the Plane of Development
for Example 7
Z0 = Starting z Parameter for Each Line
Y = Y-Coordinate in the Plane of Development

| LINE NO. | 0 | 1 | 2 | 3 | 4 | 5 | 6 | 7 | 8 | 9 | 10 |
|---|---|---|---|---|---|---|---|---|---|---|---|
| Z0 | 0.00 | 0.10 | 0.20 | 0.30 | 0.40 | 0.50 | 0.60 | 0.70 | 0.80 | 0.90 | 1.00 |
| Y | 0.000 | 0.101 | 0.205 | 0.317 | 0.439 | 0.574 | 0.723 | 0.887 | 1.076 | 1.264 | 1.489 |

TABLE 3C

Unidirectional Strains for Example 7
Tabulated Quantity is $\mu = 1/(1 + \epsilon)$ X-coordinate in plane of development

| Line no. | 0.00 | 0.25 | 0.50 | 0.75 | 1.00 | 1.25 | 1.50 | 1.75 | 2.00 | 2.25 | 2.50 |
|---|---|---|---|---|---|---|---|---|---|---|---|
| 0 | 1.000 | 0.995 | 0.979 | 0.953 | 0.918 | 0.874 | 0.821 | 0.760 | 0.693 | 0.620 | 0.543 |
| 1 | 1.000 | 0.996 | 0.982 | 0.960 | 0.930 | 0.891 | 0.845 | 0.792 | 0.732 | 0.667 | 0.597 |
| 2 | 1.000 | 0.996 | 0.086 | 0.968 | 0.944 | 0.913 | 0.875 | 0.831 | 0.782 | 0.727 | 0.688 |
| 3 | 1.000 | 0.998 | 0.990 | 0.978 | 0.960 | 0.938 | 0.911 | 0.879 | 0.842 | 0.800 | 0.755 |
| 4 | 1.000 | 0.988 | 0.994 | 0.986 | 0.974 | 0.960 | 0.942 | 0.920 | 0.985 | 0.867 | 0.836 |
| 5 | 1.000 | 0.999 | 0.996 | 0.991 | 0.984 | 0.975 | 0.965 | 0.951 | 0.936 | 0.919 | 0.899 |
| 6 | 1.000 | 0.999 | 0.998 | 0.995 | 0.991 | 0.986 | 0.980 | 0.972 | 0.964 | 0.954 | 0.943 |
| 7 | 1.000 | 1.000 | 0.999 | 0.997 | 0.995 | 0.992 | 0.989 | 0.985 | 0.981 | 0.976 | 0.971 |
| 8 | 1.000 | 1.000 | 0.999 | 0.999 | 0.998 | 0.996 | 0.995 | 0.993 | 0.992 | 0.990 | 0.988 |
| 9 | 1.000 | 1.000 | 1.000 | 0.999 | 0.999 | 0.999 | 0.998 | 0.998 | 0.998 | 0.998 | 0.998 |
| 10 | 1.000 | 1.000 | 1.000 | 1.000 | 1.000 | 1.000 | 1.000 | 1.000 | 1.000 | 1.000 | 1.000 |

TABLE 4

Cited References

1. "Line Heating", National Shipbuilding Research Program Rep. 0163 (1982)
2. Scully, K. "Laser Line Heating", J. of Ship Prod., V. 3, pp 237-246 (1987)
3. Newton, R.N.: "Practical Construction of Warships", 3rd Ed., pp. 194-205, Longman, London (1970)
4. Grilliat, J. (editor): "Construction de la Coque Metallique des Navires", Ecole Nationale Superieure de Techniques Avances, ENSTA-CN 30/36 (1976)
5. Kigore, U.: "Developable Hull Surfaces", Fishing Boats of the World, V. 3 (1967)
6. Nolan, T. J.: "Computer-Aided Design of Developable Hull Surfaces", Marine Technology V. 8, pp 233-242 (1971)
7. Kuo, C.: Computer Applications in Ship Technology, Heydon, London p. 94 (1977)
8. Clemmer, G.: "The Calculation of Sail Panels Using Developed Surfaces" 7th Chesapeake Sailing Yacht Symposium, (SNAME), (1985)
9. Kreyszig, E.: Differential Geometry, Univ. of Toronto Press, Toronto (1959)
10. Eisenhart, L. P.: A Treatise on the Differential Geometry of Curves and Surfaces, Dover, New York (1909)
11. Guggenheimer, H. W.: Differential Geometry, Dover, New York (1963)
12. Rice, J. R.: Numerical Methods, Software and Analysis, McGraw-Hill, New York (1983)
13. Fung, Y.C.: Foundations of Solid Mechanics, Prentice-Hall, Englewood Cliffs, New Jersey (1965)

TABLE 4-continued
Cited References

14. Letcher, John S., Jr.: "Mathematical Hull Design for Sailing Yachts", the Society of Naval Architects and Marine Engineers (SNAME), Chesapeake Sailing Yacht Symposium, Annapolis, Maryland, January 17, 1981
15. Letcher, John S., Jr.: "A New Approach to Numerical Fairing and Lofting", Marine Technology (MT), April 1972 (page 223)
16. Letcher, John S., Jr.: "Fairline Methods for Computer Aided Hull Design", The Society of Naval Architects and Marine Engineers (SNAME), LS-SE, January 1984
17. Kuo, Chengi: Computer Methods for Ship Surface Designs, Longman, London 1971
18. Faux and Pratt: Computational Geometry for Design and Manufacturing, Wiley, New York, 1979
19. Duff, I.S., Erisman, A. M., and Reid, J. K.: Direct Methods for Sparse Matrices, Oxford Univ. Press, New York 1986

End of Table 4

TABLE 5A
Tabular Flow Chart Summary Of Steps For Compounding A Flat Starting Blank Into A Plate Applicable To A Patch (Problem A)
Method Of Differential Equations (1) Generate a parametric surface description for the patch in parametric coordinates $u^1, u^2$.
(2) Represent the surface by two sets or families of intersecting parametric coordinate lines.
(3) Identify the parametric nodal coordinates at the intersections of the two sets of parametric lines representing the surface.
(4) Specify the intrinsic geometry of the surface at determining the Gaussian curvature $K(u^1, u^2)$ and the metric tensor $g_{\alpha\beta}$ for the surface at the respective nodal coordinates.
(5) Set up the strain equations (e.g. Equation 4 or Equation 8) relating strain $\epsilon$ to the intrinsic geometry of the patch for mapping the nodal coordinates of the patch to the image nodal coordinates on the plane of blank.
(6) Solve by intergration the strain equation for the image nodal coordinates in the plane of the blank strain $\epsilon$ at the nodal coordinates.
(7) Solve Problem B(see Table 5B).
(8) Delineate a map of nodal strain distribution alternatively either by marking directly on the starting blank or by specifying in computer memory abstract space. alternatively delineate the map of strain distribution either as a density map of indicia for guiding incremental compounding steps or as an isostrain contour map.
(9) Apply an incremental compounding process in sequential steps in accordance with the nodal strain distribution map.
(10) Monitor the thickness of the starting blank at respective nodal coordinates during sequential incremental compounding steps.
(11) Relate the monitored thickness to the desired strain of the nodal strain distribution map and control and adjust the incremental compounding steps to achieve the desired strain distribution for the compounded plate.

TABLE 5B
Tabular Flow Chart Summary Of Steps For Lofting And Cutting A Flat Starting Blank To Be Used For Compounding Into The Plate Applicable To The Patch With Zero Or Minimum Field Trim (Problem B):
Method Of Differential Equations (1) Complete Steps 1-6 of Table 5A
(2) Set up the formulae of Gauss from Equation 3 for two-vector valued functions of the parametric image nodal coordinates at the boundary of the starting blank as a function of strain distribution and the intrinsic geometry (metric tensor g or Gaussian curvature $K(u^1, u^2)$ at the nodal corrdinates of the patch.
(3) Transform the formulae of Gauss to a first set of linear partial differential equations with Christoffel coefficients.
(4) Transform the first set to a second set of linear ordinary differential equations in a second parametric coordinate system.
(5) Integrate the second set of linear ordinary differential equations using standard numerical algorithms.
(6) Solve the second set of equations for the desired number of parametric image nodal coordinates on the boundary of the blank for defining the boundary of the blank.
(7) Delineate the boundary on a development plane of a blank for cutting a blank by alternatively either specifying and marking the boundary cutting lines directly on the plane of the blank or specifying the boundary cutting lines in computer memory abstract space.
(8) Cutting the starting blank along the specified boundary cutting lines to prepare the blank for incremental compounding steps without subsequent field trim or with minimum field trim.

TABLE 6
Tabular Flow Chart Summary Of Steps For Compounding A Flat Starting Blank Into A Plate Applicable To A Patch (Problem A): And For Lofting And Cutting The Starting Blank To Be Used For Compounding Into The Plate Applicable To The Patch With Zero Or Minimum Field Trim (Problem B):
Direct Finite Element Method (1) Generate a surface description by selecting representative nodal points across the surface and boundary of the patch.
(2) Measure the geodesic distance between nodes by snapping geodesic lines (arcs) between the selected nodal Points across the surface and boundary of the patch.
(3) Set up the link equations for the geodesic lines connecting nodal point coordinates and relating image nodal coordinates on the boundaries and surface of a blank in a plane and corresponding nodal strain distribution for mapping nodal coordinates on the boundary and surface of the patch on the image nodal coordinates at the boundaries and surface of the blank.
(4) Set up additional equations by specifying the strain $\bullet$ at boundary nodal points of the blank and reducing degrees of freedom so that the number of link equations and additional equations equals the number of unknowns.
(5) Solve the simultaneous link equations at the selected nodal points of the patch for corresponding image nodal coordinate points over the surface and at the boundary in the plane of the blank using the Newton-Raphson iteration and Gauss elimination.
(6) Similarly solve the link equations for the nodal strain distribution at the corresponding image nodal point coordines over the surface and at the boundary in the plane of the blank.
(7) Specify cutting lines in the plane of the blank along image nodal point coordinates for the boundary of the blank by alternatively either marking the cutting lines directly on the blank or defining the cutting lines in computer memory abstract space.
(8) Cut the starting blank along the specified cutting lines.
(9) Map the nodal strain distribution for the plane of the blank at the selected image nodal points over the surface of the blank by alternatively delineating the map of strain distribution by

TABLE 6-continued

Tabular Flow Chart Summary Of Steps For Compounding A Flat Starting Blank Into A Plate Applicable To A Patch (Problem A): And For Lofting And Cutting The Starting Blank To Be Used For Compounding Into The Plate Applicable To The Patch With Zero Or Minimum Field Trim (Problem B):

Direct Finite Element Method marking directly on the starting blank or by delineating the map of strain distribution in computer memory abstract space. Alternatively delineate the map of strain distribution either as a density map of indicia representing and guiding incremental compounding steps for a selected incremental compounding process or as an isostrain contour map.

(10) Apply an incremental compounding process in sequential steps to the blank in accordance with nodal strain distribution map.

(11) Monitor the thickness of the blank at respective nodal points during sequentail application of the incremental steps of the compounding process.

(12) Relate the monitored thickness to the desired strain of the nodal strain distribution map and adjust the application of incremental compounding steps for causing a strain distribution map for. with the nodal strain distribution map for compounding into a plate applicable to the patch.

TABLE 7

Tabular Flow Chart Steps For Compounding A Flat Starting Blank Into A Plate Applicable To A Patch (Problem A) And For Lofting And Cutting The Starting Blank For Compounding To The Plate Applicable To The Patch With Zero Or Minimum Field Trim (Problem B):

Method Of Geodesic Parallel Corrdinates For Unidirectional Strain (1) Define an arbitrary smooth curve G1 between two arbitrary points P1 and P2 on oppostie sides or corners of the patch.

(2) Generate a family of geodesic lines or curves GF by shooting geodesics along G1 and orthogonal to G1.

(3) Define and establish parametic coordinates $v^1$, $v^2$ of selected nodal points on the geodesic lines GF over the surface and boundary of the patch where coordinate $v^2$ is the coordinate arc length along G1 measured for P1 and $v^1$ is the coordinate arc length along any member of the family of geodesics GF measured from G1.

(4) Substitute in the equation of Gauss and set up the general strain equation defining a strain related parameter as a function of Gaussian curvature of the patch for mapping the patch onto the plane of a blank.

(5) Simplify the general strain equation to a second order ordinary differential equation by specifying the parametric line $v^2$ as a constant for unidirectional strain.

(6) Solve the strain equation for unidirectional strain at parametric coordinates $v^1$, $v^2$ at selected nodes on the geodesic lines GF for strain distribution and for image nodal coordinates X,Y in the plane of the blank.

(7) Delineate and define the boundary lines of the blank along the image nodal coordinates on the boundary of the blank to be used for cutting lines.

(8) Alternatively specify and mark the cutting lines in the plane of the blank directly on the blank or specify the cutting lines in computer memory abstract space.

(9) Cut the starting blank along the specified cutting lines to provide a starting blank for compounding into a plate applicable to a patch with zero or minimum field trim.

(10) Map the nodal strain distribution for nodal point parametric coordinates across the surface of the plane of the blank and alternatively delineate the mark the map of strain distribution directly on and starting blank or specify the map of strain distribution in computer memory abstract space.

TABLE 7-continued

Tabular Flow Chart Steps For Compounding A Flat Starting Blank Into A Plate Applicable To A Patch (Problem A) And For Lofting And Cutting The Starting Blank For Compounding To The Plate Applicable To The Patch With Zero Or Minimum Field Trim (Problem B):

Method Of Geodesic Parallel Corrdinates For Unidirectional Strain

Alternatively delineate the map of strain distribution as a density map of indicia indicating and guiding incremental compounding steps or as an isostrain contour map.

(11) Apply an incremental compounding process in sequential steps to the blank in accordance with the nodal strain distribution map.

(12) Monitor the thickness of the blank at respective nodal points parametric coordinates during sequential steps of the incremental compounding process.

(13) And adjust the sequential compounding steps to follow the strain distribution map.

While the invention has been described with reference to particular example embodiments it is intended to cover all variations, modifications and equivalents within the scope of the following claims.

I claim:

1. A method for lofting and cutting a flat starting blank in a plane and for transforming the starting blank by compounding into a plate to be applicable to a specified patch on a surface having non-zero Gaussian curvature, said surface representing a 3-D shell structure to be fabricated by assembling plates comprising:

specifying the geometry of the patch in three dimensions including the boundaries of the patch and the surface description;

selecting a set of nodes and nodal point coordinates ($u^1$, $u^2$) representative of the boundaries and surface of the patch, snapping a mesh of geodesic lines over the surface between the nodes, and measuring the distances of the arc lengths of the geodesic lines between nodes;

setting up the link equations for the geodesic lines and solving the equations for the selected image nodal point coordinates ($X_1$, $Y_1$) in the plane of the blank and the distribution of nodal strains at the respective image nodal point coordinates ($X_1$, $Y_1$) in the plane of the blank for a mapping of the patch onto said plane;

using the image nodal point coordinates for the boundaries of the blank and specifying the cutting lines for the blank to minimize field trim on a plate to be compounded from the blank for the respective patch;

cutting a flat blank along the specified boundary cutting lines for minimizing field trim on a plate to be compounded from the blank;

preparing a map of the nodal strain distribution at the selected image nodal point coordinates across the surface of the blank as a guide for compounding;

and applying sequential steps of an incremental compounding process to the blank in accordance with the map of nodal strain distribution for compounding the blank into a plate applicable in non-zero Gaussian curvature and in boundary lines to the patch.

2. The method of claim 1 wherein the step of selecting a set of nodes comprises subdividing the patch into a set of triangular elements and selecting the nodes where the corners of the elements meet.

3. The method of claim 1 wherein the step of specifying the geometry of the patch comprises generating a mathematical description of the patch with a set of equations specifying the location in space of points of the boundary and surface of the patch in three-dimensional x,y,z, cartesian coordinates and transforming the mathematical description from x,y,z, cartesian coordinates to a parametric coordinate system in parametric coordinates $u^1$, $u^2$ providing a parametric surface description or parametric representation of the surface as a two-dimensional manifold surface embedded in a three-dimensional space.

4. The method of claim 3 wherein the step of setting up and solving the link equations for the selected image nodal point coordinates $X_1$, $Y_1$ in the plane of the blank and the corresponding nodal strains at the respective image nodal point coordinates in the plane of the blank comprises a mapping transformation from the parametric surface description of the patch in parametric coordinates $u^1$, $u^2$ to cartesian coordinates $X_1$, $Y_1$ lying in the development plane of the blank.

5. The method of claim 1 wherein the step of specifying the geometry of the patch comprises generating a parametric surface description or parametric representation of the surface of the patch including the boundaries of the patch in parametric coordinates $u^1$, $u^2$.

6. The method of claim 1 comprising the steps of:
marking the surface of the blank with indicia representing the specified map of nodal strain distribution across the blank;
and applying a mechanical compounding process to the blank to impart the identified strain distribution across the blank for producing a plate applicable to the specified patch.

7. The method of claim 6 wherein the step of marking the surface of the blank with indicia representing the map of nodal strain distribution across the plane of the blank comprises applying a density map on the surface of the blank of indicia representative of mechanical compounding steps for a particular mechanical compounding process for guiding controlled introduction of the identified strain distribution across the blank necessary to produce a plate applicable to the specified patch.

8. The method of claim 6 wherein the step of marking the surface of the blank with indicia representing the map of strain distribution across the blank comprises applying a contour map of isostrain contour lines to guide the application of mechanical compounding steps of a specified compounding process to introduce the identified strain distribution across the blank.

9. The method of claim 1 comprising the step of monitoring the thickness of the blank during application of the incremental compounding steps where the thickness $t'$ of the plate is related to the thickness $t$ of the blank and the strain distribution across the blank according to the equation:

$$t'/t = (1 + E\epsilon)(1 + \epsilon) \quad \text{(Eq. (9))}$$

where $\epsilon$ is the strain parameter related to the strain and E is a constant of the compounding process.

10. A method for lofting and cutting a flat starting blank in a plane and for transforming the starting blank by compounding into a plate to be applicable to a specified patch on a surface having non-zero Gaussian curvature, said surface representing a 3-D shell structure to be fabricated by assembling plates, said method comprising:
generating a description of the surface using a parametric surface description in parametric coordinates $u^1$, $u^2$ and defining two families of intersecting parametric lines or curves defining the surface;
establishing a mesh or set of representative nodal coordinates $(u_1^1, u_1^2)$ at the intersections of the parametric lines representative of the surface and boundaries of the patch, said mathematical description including information establishing the metric tensor $g_{\alpha\beta}$ and Gaussian curvature $K(u^1, u^2)$ at the nodal coordinates $(u_1^1, u_1^2)$ of the patch;
setting up the fundamental strain equation relating Gaussian curvature $K(u^1, u^2)$ at the nodal coordinates $u^1, u^2$ over the patch to the strains at the nodal coordinates for mapping the nodal coordinates of the patch onto image nodal coordinates in the plane of the flat starting blank;
solving the fundamental strain equation for the distribution of strain across the blank in the plane of the blank at the representative image nodal coordinates;
setting up the formulae of Gauss for the image nodal coordinates of the blank as a function of the metric tensor $G_{\alpha\beta}$;
solving the formulae of Gauss for the boundary image nodal coordinates of the blank thereby mapping the nodal coordinates $(u_1^1, u_1^2)$ of the patch having metric tensor $g_{\alpha\beta}$ onto image nodal coordinates $(X_1, Y_1)$ in the plane of the blank having metric tensor $G_{\alpha\beta}$, and laying out the boundary lines of the blank for cutting the blank so that field trim is minimzied or eliminated during fabrication of the corresponding shell structure;
cutting a flat blank along the specified boundary lines for minimizing field trim on a plate to be compounded from the blank;
preparing a map of the nodal strain distribution at the selected image nodal coordinates across the surface of the blank as a guide for compounding;
and applying sequential steps of an incremental compounding process to the blank in accordance with the map of nodal strain distribution for compounding the blank into a plate applicable in non-zero Gaussian curvature and in boundary lines to the patch.

11. The method of claim 10 wherein the fundamental strain equation is the fundamental equation for isotropic strain of the form;

$$\Delta[\ln(1+\epsilon)] = K(u^1, u^2) \quad \text{(Eq. (4))}$$

where $\epsilon$ is the strain parameter related to strain, and $\Delta$ is the elliptic, second order, linear differential operator of Beltrami (Eq. (5)).

12. The method of claim 11 wherein the strain is isotropic and wherein the mapping of nodal coordinates having metric tensor $g_{\alpha\beta}$ to image nodal coordinates having metric tensor $G_{\alpha\beta}$ is a conformal mapping.

13. The method of claim 12 wherein the mapping functional relationship of $G_{\alpha\beta}$ to $g_{\alpha\beta}$ is of the form:

$$G_{\alpha\beta}=(1+\epsilon)^2 g_{\alpha\beta} \qquad \text{(Eq. 3)}$$

14. The method of claim 10 wherein the mapping of nodal coordinates with metric tensor $g_{\alpha\beta}$ to image nodal coordinates with metric tensor $G_{\alpha\beta}$ is anisotropic, wherein the resulting anisotropic strain $\epsilon$ is a function of the angle $\theta$ from the direction of greatest strain elongation, and wherein $$\epsilon(\theta)=(\cos^2\theta = E\sin^2\theta), \qquad \text{(Eq. 6)}$$

where E is a constant characteristic of the anisotropy, $E=1$ for isotropic strain, and $E=0$ for unidirectional strain.

15. The method of claim 10 wherein the curvature $K(u^1,u^2)$ in the plane of the blank is zero and wherein the formulae of Gauss for the coordinates of the blank as a function of the metric tensor $G_\alpha$ are of the form $$\vec{X}_1 \cdot \vec{X}_1 = G_{11}, \quad \vec{X}_1 \cdot \vec{X}_2 = G_{12},$$
$$\vec{X}_2 \cdot \vec{X}_2 = G_{22} \qquad \text{Eq. (10)}$$

where $\vec{X}$ is a two-vector-valued coordinate function $\vec{X} = \vec{X}(u^1,u^2)$.

16. The method of claim 16 further comprising the steps:
marking the surface of the blank with marks representing the map of strain distribution solved across the plane of the blank at the representative surface coordinates by applying a density map across the blank, said density map comprising marks representing incremental compounding steps of a specified compounding process for guiding controlled introduction of strain across the blank in accordance with the map of strain distribution solved at the representative surface image nodal coordinates.

17. The method of claim 10 wherein the step of preparing a map of strain distribution comprises:
generating a density map comprising indicia representing incremental compounding steps for guiding introduction of strain by a specified compounding process across the blank in accordance with the map of strain distribution solved at the representative surface image nodal coordinates.

18. The method of claim 10 comprising the steps:
marking the surface of the blank with indicia representing the map of strain distribution across the plane of the blank solved at the representative surface image nodal coordinates by applying a contour map on the surface of the blank, said contour map comprising isostrain lines for guiding the density of mechanical compounding steps for controlled introduction of the specified strain distribution across the blank.

19. The method of claim 10 wherein the step of preparing a map of strain distribution comprises:
generating a contour map comprising indicia representing isostrain lines for guiding the density of mechanical compounding steps for controlled introduction of the specified strain distribution solved at the representative image nodal coordinates across the blank.

20. The method of claim 10 comprising the step of monitoring the thickness of the blank during the compounding steps where the thickness $t'$ of the plate is related to the thickness t of the blank and the strain distribution according to the equation:

$$t'/t = (1+E\epsilon)(1+\epsilon) \qquad \text{Eq. (9)}$$

where $\epsilon$ is the strain parameter related to the strain and E is a constant of the compounding process.

21. A method for lofting and cutting a flat starting blank in a plane and for transforming the starting blank by compounding into a plate using a unidirectional or orthotopic incremental compounding process, said plate to be applicable to a specified patch on a surface having non-zero Gaussian curvature, said surface representing a 3-D shell structure to be fabricated by assembling plates comprising:
establishing a curve or line G1 between two selected points P1 and P2 on the patch P;
shooting a family of geodesic lines GF from points along G1 in the direction orthogonal to line G1;
identifying the various members of the family of geodesic lines GF according to the arc length coordinate $v^2$ along G1 measured from P1 to the intersection of the member of GF with G1;
identifying the arc length coordinate $v^1$ along any member of GF measured from G1 for selected nodal points on the geodesic lines GF;
setting up the metric tensor for the selected nodal point parametric coordinates $v^1$, $v^2$ on the geodesic lines and setting up the strain equation in differential equation form relating the Gaussian curvature and strain at the selected nodal point parametric coordinates across the patch for mapping the patch onto the plane of the blank;
solving the differential strain equation at the selected nodal point parametric coordinates on the geodesic lines for the strain distribution across the blank mapped on to the plane of the blank at respective image nodal point coordinates $X_1$, $Y_1$;
cutting a flat blank along the specified boundary lines for minimizing field trim on a plate to be compounded from the blank;
preparing a map of the nodal strain distribution at the respective image nodal point coordinates across the surface of the blank as a guide for compounding;
and applying sequential steps of an incremental compounding process to the blank in accordance with the map of nodal strain distribution for compounding the blank into a plate applicable in non-zero Gaussian curvature and in boundary lines to the patch.

22. The method of claim 21 wherein the step of preparing a map of strain distribution comprises: generating indicia representing incremental compounding steps of a unidirectional or orthotopic compounding process for guiding application of the unidirectional or orthotopic mechanical compounding process for introducing strain according to the map of strain distribution solved across the blank to produce a plate applicable to the specified patch in Gaussian curvature and boundaries.

23. The method of claim 22 wherein the indicia comprise a density map of lines applied band marked directly on the surface of the blank representing heat lines for application of line heating compounding steps.

24. The method of claim 23 comprising the step of monitoring the thickness of the blank during the compounding steps where the thickness t' of the plate is related to the thickness t of the blank and the strain distribution according to the equation:

$$t'/t = (1 + E\epsilon)(1 + \epsilon) \quad \text{(Eq. (9))}$$

where $\epsilon$ is the strain parameter related to the strain and E is a constant of the incremental compounding process, E being 0 for line heating.

25. The method of claim 23 wherein the lines of the density map follow geodesic lines of the plate or patch mapped onto the plane of the blank.

26. The method of claim 25 wherein the boundaries of the patch are selected as geodesic lines of the surface of the patch.

27. The method of claim 21 wherein the curve or line G1 is a parallel of a surface of revolution and wherein the family of geodesic lines GF comprises meridians.

28. A method for lofting and cutting flat starting blanks in a plane and for transforming the starting blanks by compounding into plates to be applicable to patches on a surface having non-zero Gaussian curvature, said surface representing a 3-D shell structure to be fabricated by assembling plates comprising:

generating a description of the geometry of the patch which relates intrinsic properties of the geometry of the patch that are invariant under bending;

identifying a set of nodes across the surface of the patch representative of the surface and boundaries of the patch;

setting up equations that relate the nodes and intrinsic properties of the geometry of the patch to the strain required for mapping the nodes from the surface and boundaries of the patch to image nodes in the plane of the blank;

solving the equations and determining the distribution of strain at the selected nodes of the patch which will map the nodes onto the image nodes in the plane of the blank;

using the image nodes for the boundaries of the blank to specify cutting lines for the blank to minimize field trim on a plate to be compounded from the blank for the respective patch;

cutting a flat blank along the specified boundary cutting lines for minimizing field trim on a plate to be compounded from the blank;

preparing a map of the nodal strain distribution at the selected image nodes across the surface of the blank as a guide for compounding;

and applying sequential steps of an incremental compounding process to the blank in accordance with the map of nodal strain distribution for compounding the blank into a plate applicable in non-zero Gaussian curvature and in boundary lines to the patch.

29. The method of claim 28 comprising the step of marking the surface of the blank with indicia representing the identified map of strain distribution.

* * * * *